United States Patent
Ownby et al.

(10) Patent No.: US 10,198,606 B2
(45) Date of Patent: *Feb. 5, 2019

(54) RADIO FREQUENCY IDENTIFICATION TAG DELIVERY SYSTEM

(71) Applicant: Weatherford Technology Holdings, LLC, Houston, TX (US)

(72) Inventors: John Fielding Ownby, Houston, TX (US); Jobby T. Jacob, Sugar Land, TX (US); Richard Lee Giroux, Bellville, TX (US); Matthew David Knight, Aberdeenshire (GB); Richard Alastair Howard Dalzell, Kirriemuir (GB); Jake M. Boudreaux, Raceland, LA (US); Robert B. Marcel, Jr., Houma, LA (US); Rupa Sharma, Cypress, TX (US); Larry A. Kendziora, Needville, TX (US); Eric R. Evans, Magnolia, TX (US); Rajesh D. Patel, Sugar Land, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/880,922

(22) Filed: Jan. 26, 2018

(65) Prior Publication Data
US 2018/0150660 A1    May 31, 2018

Related U.S. Application Data

(63) Continuation of application No. 15/153,421, filed on May 12, 2016, now Pat. No. 9,911,016.
(Continued)

(51) Int. Cl.
*G06F 19/00* (2018.01)
*G06K 7/10* (2006.01)
(Continued)

(52) U.S. Cl.
CPC .......... *G06K 7/10316* (2013.01); *E21B 23/00* (2013.01); *E21B 33/16* (2013.01);
(Continued)

(58) Field of Classification Search
CPC ............. G06Q 10/087; G06K 7/10881; G06K 17/0022
(Continued)

(56) References Cited

U.S. PATENT DOCUMENTS

| 6,360,822 B1 | 3/2002 | Robertson |
| 6,536,524 B1 | 3/2003 | Snider |

(Continued)

FOREIGN PATENT DOCUMENTS

| GB | 2407335 A | 4/2005 |
| WO | 2008146012 A2 | 12/2008 |
| WO | 2012/140445 A2 | 10/2012 |

OTHER PUBLICATIONS

Weatherford—RFID-Based Keystone™ System Provides Intervention-Free Upper Completion, Reduces NPT, Personnel, Rig Time, and Costs brochure, 2013, 2 pages.
(Continued)

*Primary Examiner* — Daniel St Cyr
(74) *Attorney, Agent, or Firm* — Patterson + Sheridan, LLP

(57) ABSTRACT

A system for operating a downhole tool includes a tag carrier; a RFID tag coupled with the tag carrier; and a control sub having a bore extending therethrough, the control sub comprising: an antenna located adjacent to the bore; and a stop for catching the tag carrier, wherein: the radio frequency identification tag is coupled with the tag carrier in relation to the stop and the antenna such that the radio frequency identification tag is aligned with the antenna when the tag carrier is caught in the stop, and the stop is operable
(Continued)

to allow passage of the tag carrier through the stop after the tag carrier is caught by the stop.

22 Claims, 20 Drawing Sheets

Related U.S. Application Data

(60) Provisional application No. 62/161,344, filed on May 14, 2015.

(51) Int. Cl.

| | | |
|---|---|---|
| *E21B 23/00* | (2006.01) | |
| *E21B 33/16* | (2006.01) | |
| *E21B 34/14* | (2006.01) | |
| *E21B 47/12* | (2012.01) | |
| *G06K 19/077* | (2006.01) | |

(52) U.S. Cl.
CPC ............ *E21B 34/14* (2013.01); *E21B 47/122* (2013.01); *G06K 19/07758* (2013.01)

(58) Field of Classification Search
USPC ................. 235/385, 380, 462.46, 472.02
See application file for complete search history.

(56) References Cited

U.S. PATENT DOCUMENTS

| | | |
|---|---|---|
| 6,597,175 B1 | 7/2003 | Brisco |
| 6,789,619 B2 | 9/2004 | Carlson et al. |
| 7,066,256 B2 | 6/2006 | Dillenbeck et al. |
| 7,252,152 B2 | 8/2007 | LoGiudice et al. |
| 7,455,108 B2 | 11/2008 | Jenkins et al. |
| 8,393,389 B2 | 3/2013 | Brisco et al. |
| 8,540,035 B2 | 9/2013 | Xu et al. |
| 8,567,515 B2 | 10/2013 | Giroux et al. |
| 8,627,884 B2 | 1/2014 | Watson |
| 9,428,998 B2 | 8/2016 | Turley et al. |
| 9,488,046 B2 | 11/2016 | Purkis |
| 9,777,569 B2 | 10/2017 | Turley et al. |
| 2003/0023161 A1* | 1/2003 | Govari ............... A61B 5/06 600/423 |
| 2007/0249901 A1* | 10/2007 | Ohline ............... A61B 1/005 600/117 |
| 2008/0316049 A1 | 12/2008 | Verret et al. |
| 2013/0118752 A1 | 5/2013 | Hannegan et al. |
| 2013/0319767 A1 | 12/2013 | Wilson et al. |
| 2014/0262211 A1 | 9/2014 | Xu et al. |
| 2014/0305662 A1 | 10/2014 | Giroux et al. |
| 2015/0027724 A1 | 1/2015 | Symms |
| 2015/0090494 A1 | 4/2015 | Lazarev et al. |
| 2015/0136395 A1 | 5/2015 | Turley et al. |
| 2015/0136396 A1 | 5/2015 | Turley et al. |
| 2017/0159363 A1 | 6/2017 | Lazarev et al. |

OTHER PUBLICATIONS

Weatherford—Casing Wiper Plugs and Darts brochure, 2013, 58 pages.

PCT Invitation to Pay Additional Fees dated Oct. 19, 2016, with Communication Relating to the Results of the Partial International Search, for International Patent Application No. PCT/US2016/032268.

PCT International Search Report and Written Opinion dated Jan. 2, 2017, for International Patent Application No. PCT/US2016/032268.

\* cited by examiner

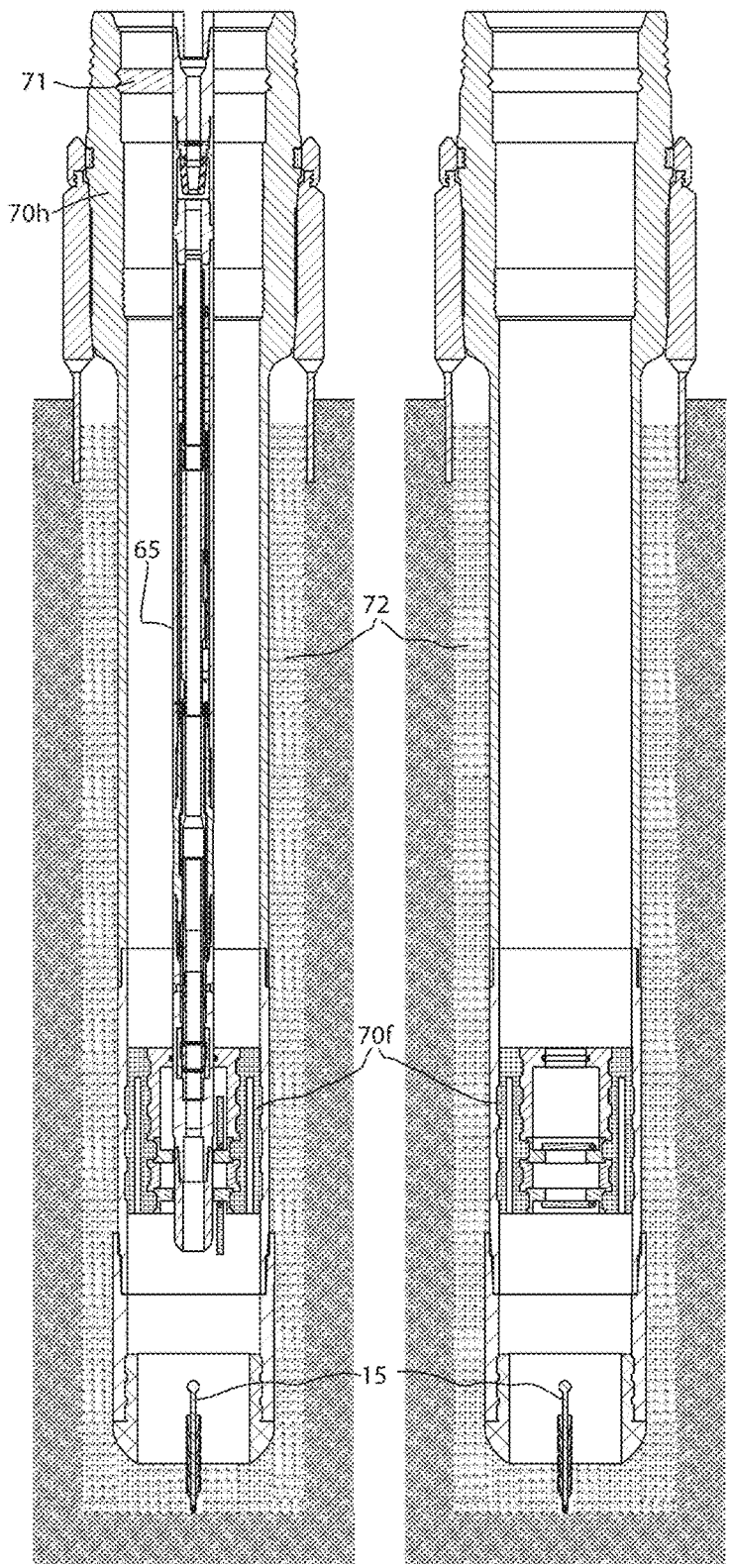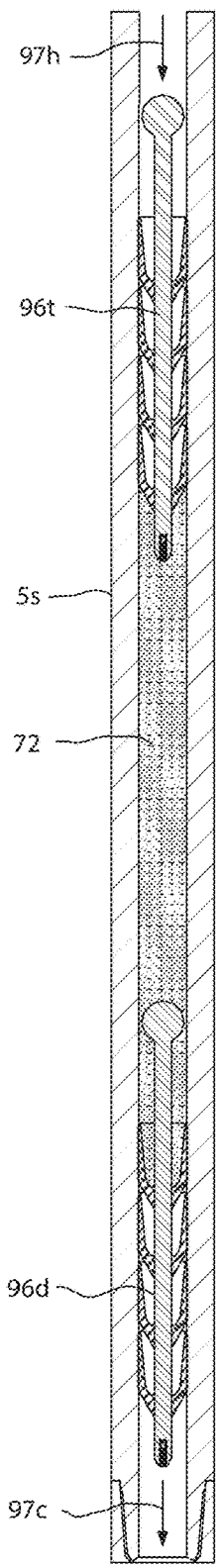
FIG. 9A  FIG. 9B  FIG. 9C

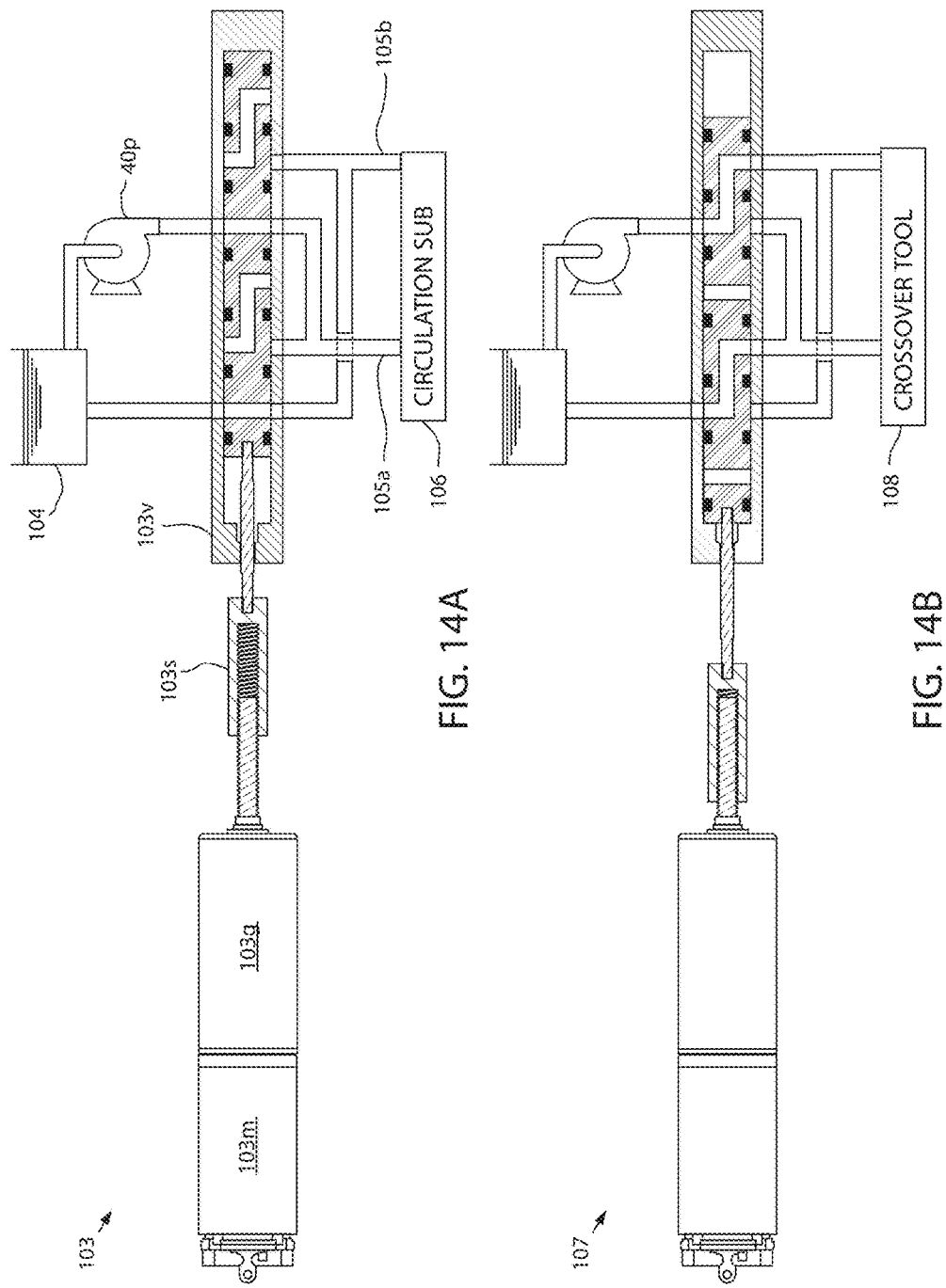

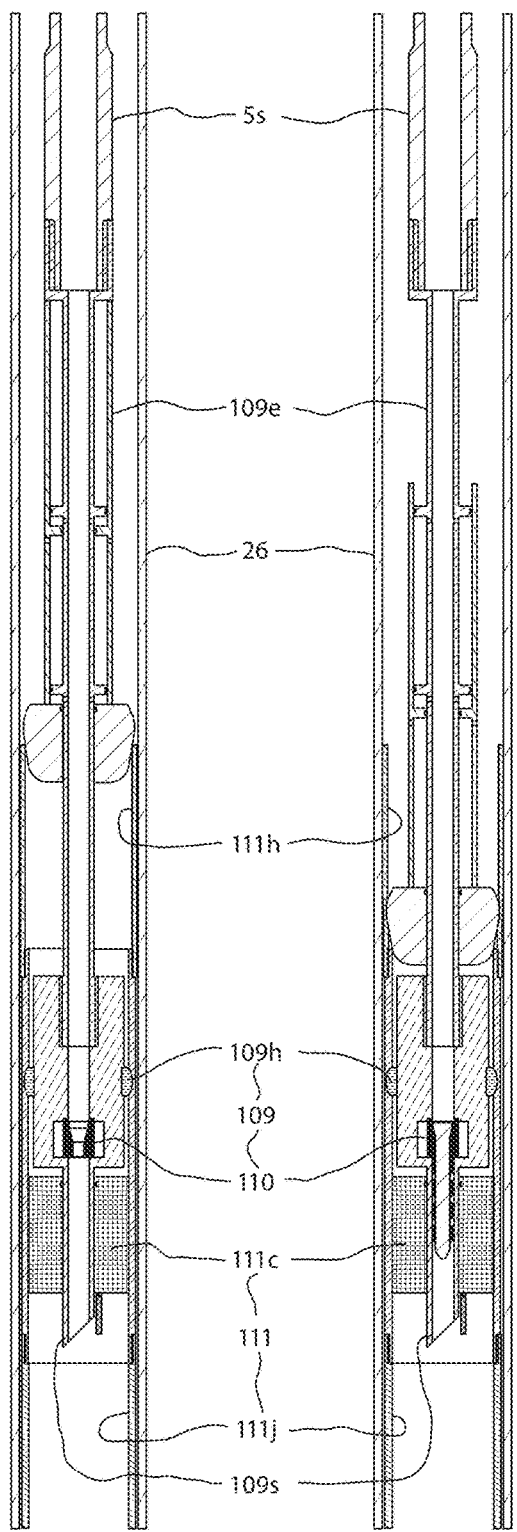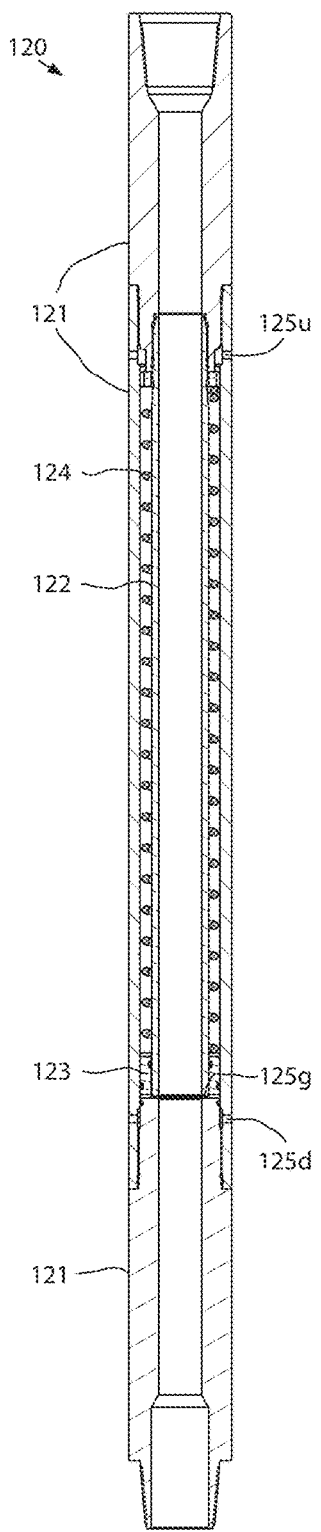
FIG. 15A  FIG. 15B  FIG. 15C

RADIO FREQUENCY IDENTIFICATION TAG DELIVERY SYSTEM

CROSS-REFERENCE TO RELATED APPLICATIONS

This application is a continuation of co-pending U.S. patent application Ser. No. 15/153,421, filed May 12, 2016, which claims benefit of U.S. provisional patent application Ser. No. 62/161,344, filed May 14, 2015. Each of the aforementioned related patent applications is herein incorporated by reference.

BACKGROUND OF THE DISCLOSURE

Field of the Disclosure

The present disclosure generally relates to a radio frequency identification (RFID) tag delivery system.

Description of the Related Art

A wellbore is formed to access hydrocarbon-bearing formations (e.g., crude oil and/or natural gas) or for geothermal power generation by the use of drilling. Drilling is accomplished by utilizing a drill bit that is mounted on the end of a drill string. To drill within the wellbore to a predetermined depth, the drill string is often rotated by a top drive on a drilling rig. After drilling to a predetermined depth, the drill string and drill bit are removed and a string of casing is lowered into the wellbore. An annulus is thus formed between the casing string and the wellbore. The casing string is hung from the wellhead. A cementing operation is then conducted in order to fill the annulus with cement. The casing string is cemented into the wellbore by circulating cement into the annulus defined between the outer wall of the casing and the borehole. The combination of cement and casing strengthens the wellbore and facilitates the isolation of certain areas of the formation behind the casing for the production of hydrocarbons.

Several downhole tools employed in the drilling and construction of the wellbore require selective downhole actuation, for example by dropping or pumping plugs or other devices down a bore of a tubular string (for example, a drill, casing, conductor, liner, or work string) to land in the downhole tool. The downhole tool is usually restrained in a deployment position by shearable fasteners which are released by the application of the fluid pressure against the landed plug, thereby shifting the tool to an activated position. This actuation method suffers from several deficiencies. A surge in wellbore pressure may prematurely actuate the tool. It may also be desirable to return the downhole tool to the deployment position once the tool has been used in the activated position.

SUMMARY OF THE DISCLOSURE

The present disclosure generally relates to a radio frequency identification (RFID) tag delivery system. In one embodiment, a system for operating a downhole tool includes a tag carrier; a radio frequency identification tag coupled with the tag carrier; and a control sub having a bore extending therethrough, the control sub comprising: an antenna located adjacent to the bore; and a stop for catching the tag carrier, wherein: the radio frequency identification tag is coupled with the tag carrier in relation to the stop and the antenna such that the radio frequency identification tag is aligned with the antenna when the tag carrier is caught in the stop, and the stop is operable to allow passage of the tag carrier through the stop after the tag carrier is caught by the stop.

In another embodiment, a method of operating a downhole tool includes launching a tag carrier carrying a radio frequency identification tag into a tubular string, wherein the tubular string comprises a control sub and a downhole tool; pumping the tag carrier down the tubular string; catching the tag carrier in a stop of the control sub; and transmitting a command signal from the radio frequency identification tag to an antenna of the control sub while the tag carrier is caught in the stop.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 7B-9B illustrate an inner string cementing operation performed using the control sub and the alternative circulation sub.

FIG. 9C illustrates a cementing operation being performed using a first alternative tag delivery system.

FIGS. 13B and 14A illustrate a second alternative control sub, according to another embodiment of the present disclosure. FIG. 14B illustrates another second alternative control sub for operating a crossover tool, according to another embodiment of the present disclosure.

FIGS. 15A illustrates a liner deployment assembly having a third alternative control sub, according to another embodiment of the present disclosure. FIG. 15B illustrates operation of the liner deployment assembly. FIG. 15C illustrates an accumulator for use with an alternative liner deployment assembly, according to another embodiment of the present disclosure.

DETAILED DESCRIPTION

Figure 1:
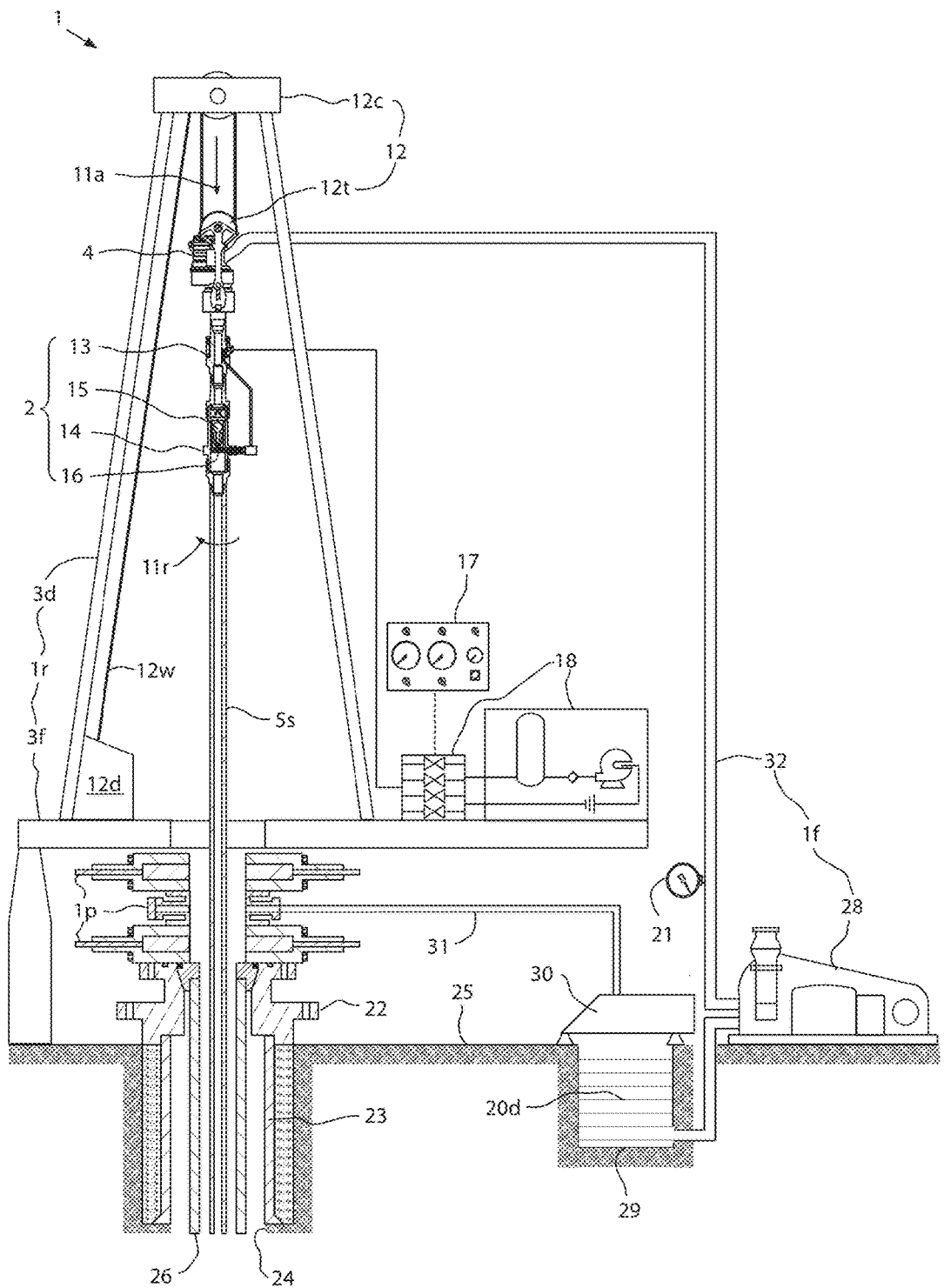
FIGS. 1, 2A, and 2B illustrate drilling of a wellbore using a drilling system having a tag delivery system, according to one embodiment of the present disclosure.
Figures 2A, 2B:
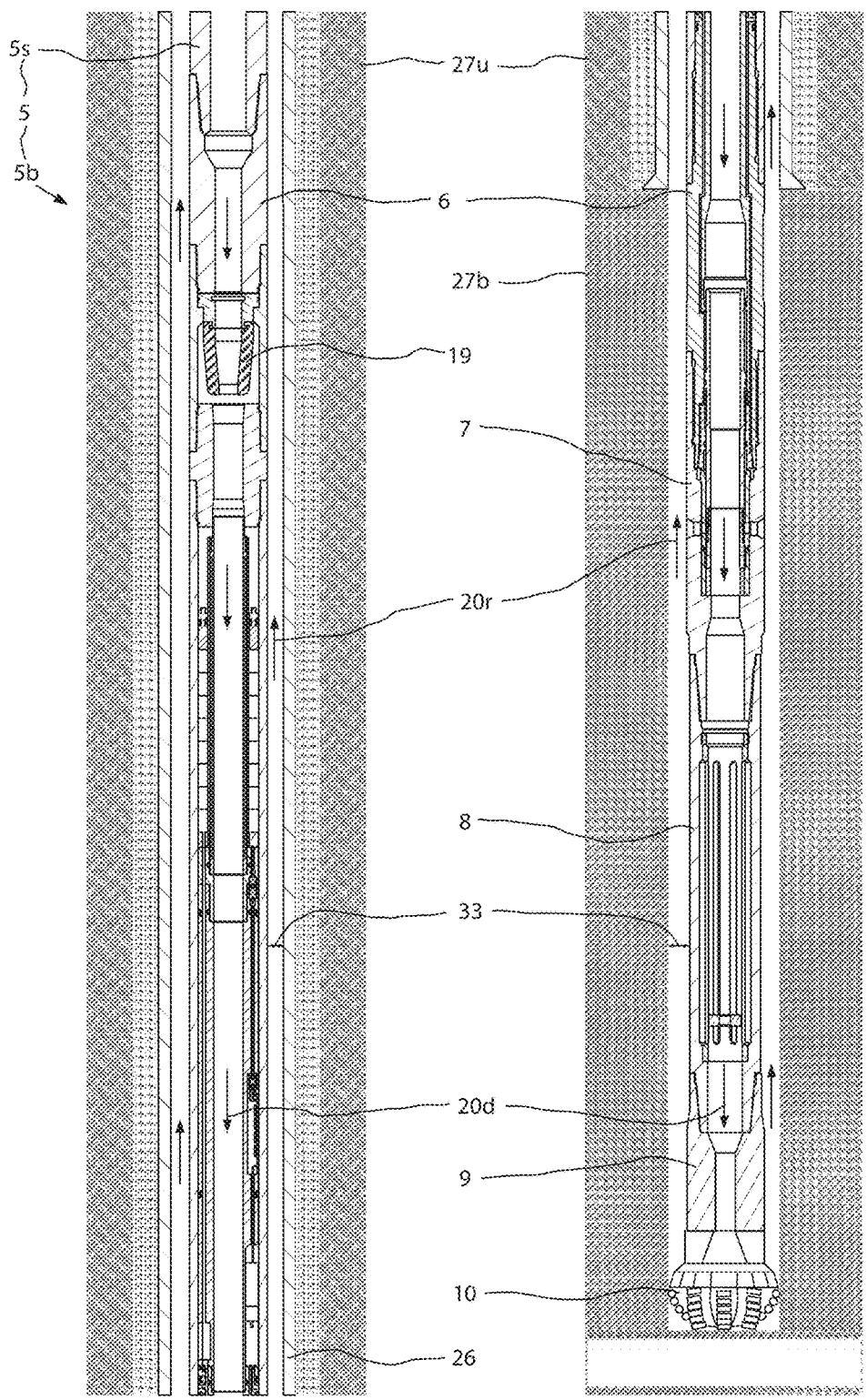

FIGS. 1, 2A, and 2B illustrate drilling of a wellbore using a drilling system 1 having a tag delivery system 2, according to one embodiment of the present disclosure. The drilling system 1 may include a drilling rig 1r, a fluid handling system 1f, a pressure control assembly (PCA) 1p, the tag delivery system 2, and a drill string 5. The drilling rig 1r may include a derrick 3d, a floor 3f, a top drive 4, and a hoist 12. The rig floor 3f may have an opening through which the drill string 5 extends downwardly into the PCA 1p.

The drill string 5 may include a bottomhole assembly (BHA) 5b and a tubular string 5s. The tubular string 5s may include joints of drill pipe connected together, such as by threaded couplings. The BHA 5b may be connected to the tubular string 5s, such as by threaded couplings. The BHA 5b may include a control sub 6, a downhole tool, such as circulation sub 7, a catcher 8, one or more drill collars 9, and a drill bit 10. Each BHA component 6-10 may be connected to adjacent component(s), such as by threaded couplings. The drill bit 10 may be rotated 11r by the top drive 4 via the tubular string 5s, and/or the BHA 5b may further include a drilling motor (not shown) for rotating the drill bit. The BHA 5b may further include an instrumentation sub (not shown), such as a measurement while drilling and/or a logging while drilling sub.

The tag delivery system 2 may include a swivel 13, a tag carrier launcher 14, a tag carrier, a radio frequency identification (RFID) tag 16, a control console 17, a hydraulic power unit (HPU) 18, and a stop 19. The tag carrier may be a pump down plug, such as a dart 15. As used herein, radio frequency identification (RFID) tag refers to tags that carry only identification information, as well as transponders that carry additional information, including pre-programmed command signals (that may include identification information). The RFID tag 16 may be attached to, disposed in or on, and/or otherwise coupled with the tag carrier. The swivel 13 may include a housing torsionally connected to the derrick 3d, such as by bars, wire rope, or a bracket (not shown). The torsional connection may accommodate longitudinal movement of the swivel 13 relative to the derrick 3d. The swivel 13 may further include a mandrel and bearings for supporting the housing from the mandrel while accommodating rotation 11r of the mandrel. An upper end of the mandrel may be connected to a quill of the top drive 4, such as by threaded couplings. The housing may have an inlet in fluid communication with a passage formed through the mandrel and the swivel 13 may further include a seal assembly for isolating the inlet-passage communication. The mandrel passage may extend to an outlet for connection to a hydraulic conduit for operating a hydraulic actuator (e.g., a launcher actuator) of the tag carrier launcher 14. The swivel inlet may be in fluid communication with the HPU 18 operated by the control console 17. The control console 17 may be located on or near the floor 3f, at another location on the drilling rig 1r, or the control console 17 may be located remotely from the drilling rig 1r.

Alternatively, the swivel 13 may be omitted, and the launcher actuator may be connected to a hydraulic swivel of the top drive 4.

The tag carrier launcher 14 may include a body, a deflector, a canister, a gate, an adapter, and the actuator. The body may be tubular and may have a bore therethrough. An upper end of the body may be connected to a lower end of the swivel 13, such as by threaded couplings, and a lower end of the body may be connected to a top of the launcher adapter, such as by threaded couplings. The canister and deflector may each be disposed in the body bore. The deflector may be connected to the swivel mandrel, such as by threaded couplings. The canister may be longitudinally movable relative to the body. The canister may be tubular and have ribs formed along and around an outer surface thereof. Bypass passages may be formed between the ribs. Each canister may further have a landing shoulder formed in a lower end thereof for receipt by a landing shoulder of the launcher adapter. The launcher adapter may be connected to a lower end of the body and a top of the tubular string 5s, such as by threaded couplings. The deflector may be operable to divert drilling fluid 20d received from the swivel 13 away from a bore of the canister and toward the bypass passages.

Figure 4A:
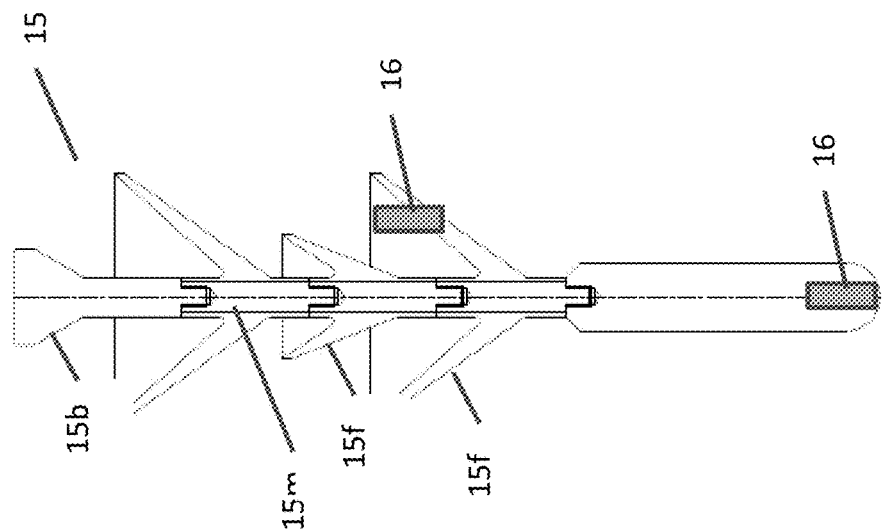
FIGS. 4A, 4B, 4C, and 4D illustrate a tag carrier and an RFID tag of the tag delivery system.
Figure 4B:
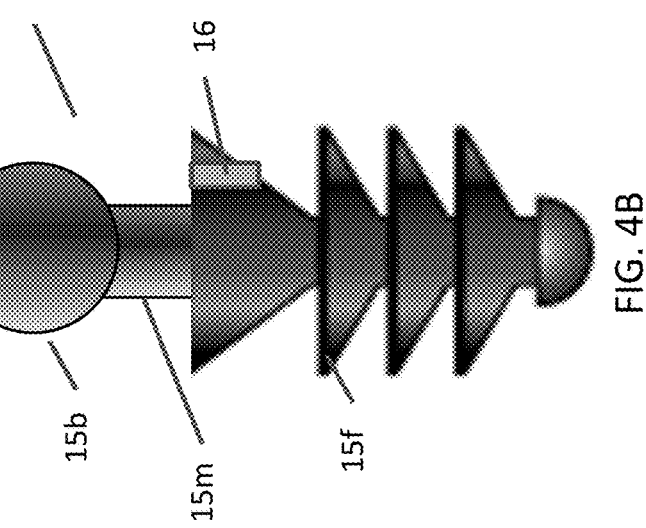
Figure 4C:
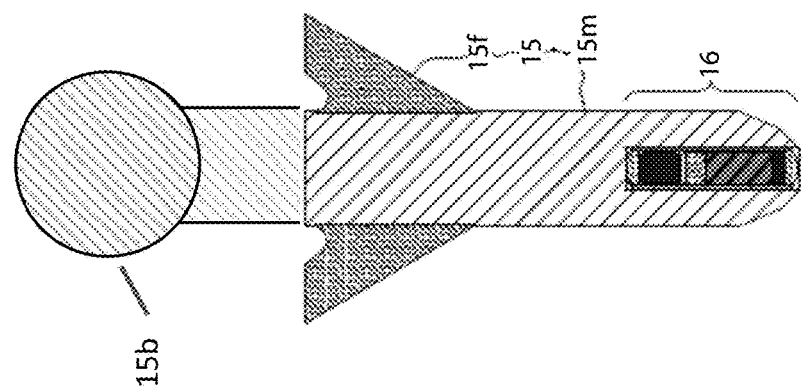
Figure 4D:
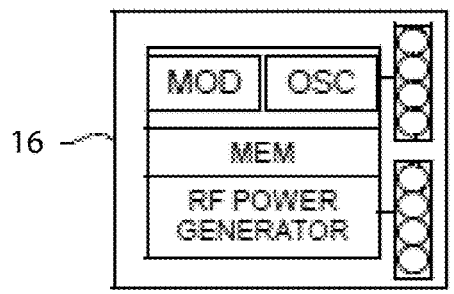
Figures 5A, 5B, 5C, 5D:
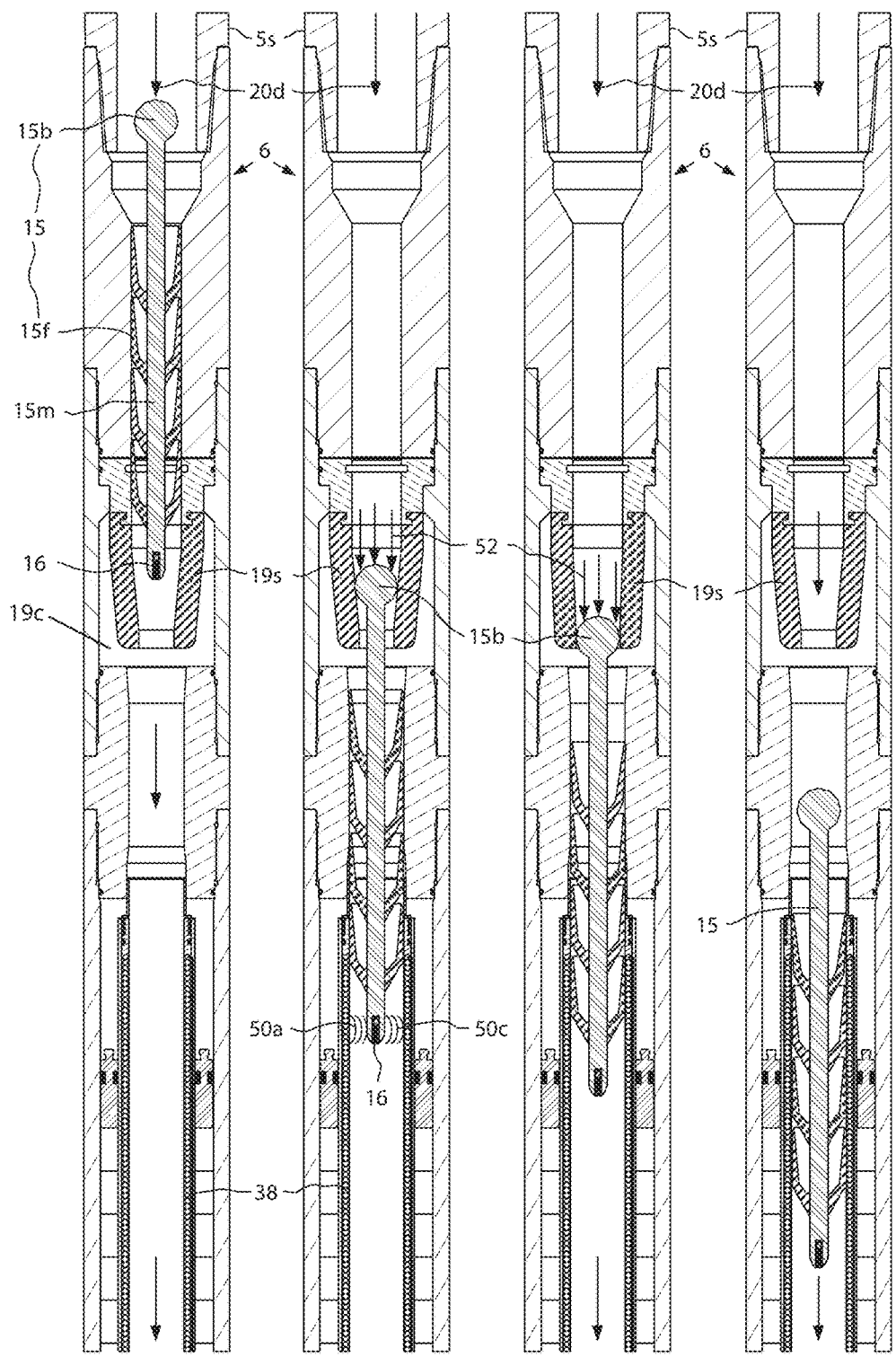
FIGS. 5A-5D illustrate operation of the tag delivery system.
Figures 6A, 6B, 6C:
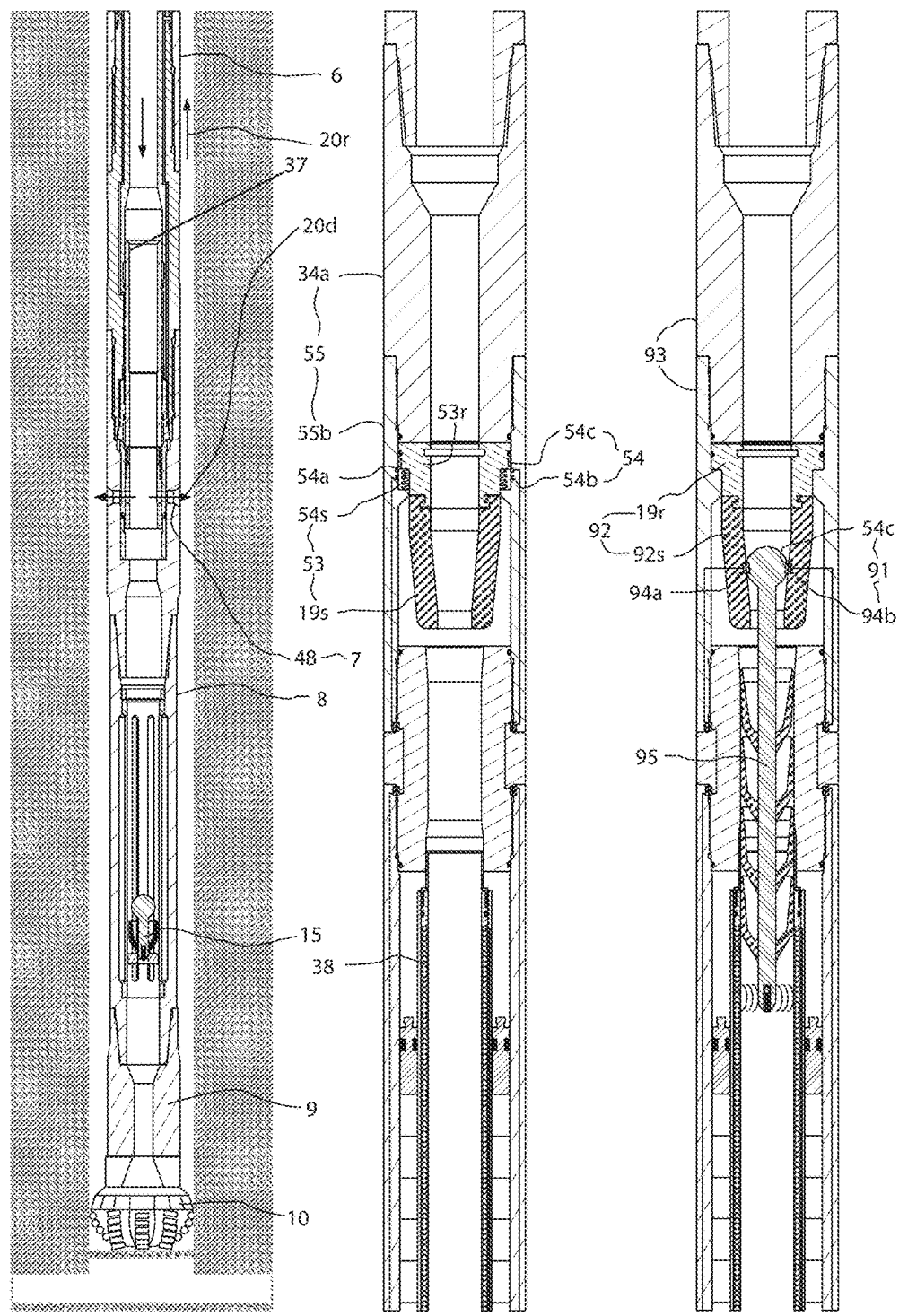
FIG. 6A illustrates a cleanout operation being performed using the circulation sub.
FIG. 6B illustrates an arrival sensor for the tag delivery system, according to another embodiment of the present disclosure.
FIG. 6C illustrates an alternative arrival sensor for the tag delivery system, according to another embodiment of the present disclosure.

Example darts 15, suitable for use as a tag carrier, is shown schematically in FIGS. 1 and 6A and in more detail in FIGS. 4A, 4B, 4C, and 5A. Dart 15 may be disposed in a bore of tubular string 5s. The tag carrier may have a catch element. For example, dart 15 may include a ball stud 15b. The ball stud 15b may have a variety of shapes, such as generally spherical as seen in FIGS. 4A and 4B, or generally conical as seen in FIG. 4C. Dart 15 may also include finned seal and a mandrel 15m. The mandrel 15m and ball stud 15b may include a relatively stiff and nonconductive material, such as an engineering polymer or fiber reinforced composite. The finned seal may include one or more (four shown in FIG. 5A) fins 15f, coaxial with and disposed along an outer surface of the mandrel 15m. The fins 15f may be generally circular in shape (as shown in FIGS. 4A, 4B, and 4C), and the breadth of the fins may vary (as seen in FIG. 4C). When disposed in the bore of the tubular string 5s, the fins 15f may be compressed towards the mandrel 15m (as shown in FIG. 5A). The non-compressed diameter of each of the fins 15f may vary. In some embodiments, each fin 15f may have a non-compressed diameter at least as large as the diameter of the bore of the control sub 6. Each fin 15f may include a relatively flexible material such as an elastomer or elastomeric copolymer. Fins 15f may be molded or fitted to a gland (not shown) such that the fins may be stacked along the mandrel 15m. The fin glands may also include an engineering polymer or fiber reinforced composite. As may be recognized by those skilled in the pertinent art based on the teachings herein, the tag delivery system of the present disclosure may employ a variety of tag carrier launchers, and the tag carrier with catch element may take any of numerous different shapes or configurations.

The mandrel 15m may have a stacking shoulder (not shown) formed in an outer surface thereof for retaining the fin glands. The ball stud 15b may be connected to the mandrel 15m, such as by a threaded connection, fasteners, and/or bonding. The ball stud 15b may also have a stacking shoulder (not shown) formed in an outer surface thereof for retaining the fin glands such that the finned seal is trapped between the stacking shoulders when the ball stud 15b is connected to the mandrel 15m. An outer diameter of the ball stud 15b may be greater than a diameter of the mandrel 15m and less than an outer diameter of the largest of the fins 15f (when fins 15f are fully extended). An outer diameter of the ball stud 15b may be less than a diameter of the bore of the control sub 6. The ball stud 15b may be connected to a trailing end of the mandrel 15m. In some embodiments, the mandrel 15m may have a nose formed at a leading end thereof. A receptacle may be formed in the mandrel 15m extending from the nose, and the RFID tag 16 may be disposed in the receptacle (as seen in FIGS. 4A and 4C). The receptacle may be centrally located within the dart 15. The RFID tag 16 may be retained in the receptacle, for example by a cap (not shown) releasably connected to the mandrel 15m or by bonding. The RFID tag 16 would thereby be centralized in the bore of the tubular string 5s, allowing confidence in using only one RFID tag to transmit a command signal to the control sub 6. In some embodiments, an RFID tag 16 may be located in or on a fin 15f (as seen in FIGS. 4B and 4C). The RFID tag 16 would thereby be located close to the inner surface of the tubular string 5s, potentially closer to the antenna 38 than when centralized. Closer proximity of the RFID tag 16 to the antenna 38 may provide better transmission of command signals. When located on a fin 15f, it may be desirable to affix the RFID tag 16 to the "back" of the fin 15f—the surface nearest the mandrel—so that the fin 15f shelters the RFID tag 16 during downhole travel.

The non-compressed diameter of the fins 15f may correspond to, such as being equal to, greater than, or substantially greater than, an inner diameter of the tubular string 5s. The finned seal may engage the tubular string 5s as the dart 15 is pumped through the bore thereof for sealing engagement therewith, for centering the dart therein, and for maintaining orientation of the RFID tag 16 relative to the tubular string 5s. The orientation may be a parallel relationship between a longitudinal axis of the RFID tag 16 and a longitudinal axis of the tubular string 5s. The longitudinal axis of the RFID tag 16 may vary by +/−45 degrees from parallel with the longitudinal axis of the tubular string 5s to provide for more reliable transmission of command signals.

The gate of the tag carrier launcher 14 may include a housing, a plunger, and a shaft. The gate housing may be connected to a respective lug formed in an outer surface of the launcher body, such as by threaded couplings. The plunger may be longitudinally movable relative to the housing and radially movable relative to the body between a capture position and a release position. The plunger may be moved between the positions by a linkage, such as a jackscrew, with the shaft. The shaft may be longitudinally connected to and rotatable relative to the housing. The launcher actuator may be a hydraulic motor operable to rotate the shaft relative to the housing. The actuator may include a reservoir (not shown) for receiving the spent hydraulic fluid, or the swivel 13 may include a second inlet and outlet for returning the spent hydraulic fluid to the HPU.

In operation, when it is desired to launch the dart 15, the console 17 may be operated to supply hydraulic fluid to the launcher actuator via the swivel 13. The launcher actuator may then move the plunger to the release position. The canister and dart 15 may then move downward relative to the launcher body until the landing shoulders engage. Engagement of the landing shoulders may close the canister bypass passages, thereby forcing the drilling fluid 20d to flow into the canister bore. The drilling fluid 20d may then propel the dart 15 from the canister bore into a bore of the launcher adapter and onward through the tubular string 5s.

Optionally, the launcher adapter may include an electronics package and antenna for reading the RFID tag 16 as the dart 15 is pumped therethrough for confirmation of launching of the dart and transmission of a confirmation signal to the control console 17. Alternatively, the swivel 13 and launcher actuator may be pneumatic or electric. Alternatively, the launcher actuator may be linear, such as a piston and cylinder. Alternatively, the tag carrier launcher 14 may include a main body having a main bore and a parallel side bore, with both bores being machined integral to the main body. The dart 15 may be loaded into the main bore, and a dart releaser valve may be provided below the dart to maintain it in the capture position. The dart releaser valve may be side-mounted externally and extend through the main body. A port in the dart releaser valve may provide fluid communication between the main bore and the side bore. In a bypass position, the dart 15 may be maintained in the main bore with the dart releaser valve closed. Fluid may flow through the side bore and into the main bore below the dart via the fluid communication port in the dart releaser valve. To release the dart 15, the dart releaser valve may be turned, such as by ninety degrees, thereby closing the side bore and opening the main bore through the dart releaser valve. The drilling fluid 20d may then enter the main bore behind the dart 15, causing it to drop downhole.

The top drive 4 may include a motor for rotating 11r the drill string 5. The top drive motor may be electric or hydraulic. A frame of the top drive 4 may be coupled to a rail (not shown) of the derrick 3d for preventing rotation thereof during rotation 11r of the drill string 5, and allowing for vertical movement of the top drive with a traveling block 12t of the rig hoist 12. The frame of the top drive 4 may be suspended from the derrick 3d by the traveling block 12t. The traveling block 12t may be supported by wire rope 12w connected at its upper end to a crown block 12c of the rig hoist 12. The wire rope 12w may be woven through sheaves of the blocks 12c,t and extend to draw works 12d of the hoist 12 for reeling thereof, thereby raising or lowering the traveling block 12t relative to the derrick 3d.

The PCA 1p may include one or more blow out preventers (BOPs) and a flow cross. A housing of each BOP and the flow cross may each be interconnected and/or connected to a wellhead 22, such as by a flanged connection. The wellhead 22 may be mounted on a tubular string, such as outer casing string 23 which has been deployed into a wellbore 24 drilled from a surface 25 of the earth and cemented into the wellbore. A tubular string, such as inner casing string 26 has been deployed into the wellbore 24, hung from the wellhead 22, and cemented into place. The inner casing string 26 may extend to a depth adjacent a bottom of an upper formation 27u. The upper formation 27u may be non-productive and a lower formation 27b may be a hydrocarbon-bearing reservoir.

Alternatively, the lower formation 27b may be non-productive (e.g., a depleted zone), environmentally sensitive, such as an aquifer, or unstable. Alternatively, the wellbore 24 may be subsea having a wellhead located adjacent to the waterline and the drilling rig 1r may be a located on a platform adjacent the wellhead. Alternatively, the wellbore 24 may be subsea having a wellhead located adjacent to the seafloor and the drilling rig 1r may be a located on an offshore drilling unit.

The fluid system 1f may include a pressure gauge 21, a mud pump 28, a drilling fluid reservoir, such as a pit 29 or tank, a solids separator, such as a shale shaker 30, a return line 31, a feed line, and a supply line 32. A first end of the return line 31 may be connected to a branch of the flow cross and a second end of the return line may be connected to an inlet of the shaker 30. A lower end of the supply line 32 may be connected to an outlet of the mud pump 28 and an upper end of the supply line may be connected to an inlet of the top drive 4. The pressure gauge 21 may be assembled as part of the supply line 32. A lower end of the feed line may be connected to an outlet of the pit 29 and an upper end of the feed line may be connected to an inlet of the mud pump 28. The pressure gauge 21 may be used to monitor standpipe pressure.

The drilling fluid 20d may include a base liquid. The base liquid may be refined and/or synthetic oil, water, brine, or a water/oil emulsion. The drilling fluid 20d may further include solids dissolved or suspended in the base liquid, such as organophilic clay, lignite, and/or asphalt, thereby forming a mud.

To extend the wellbore 24 from a shoe of the inner casing string 26 into the lower formation 27b, the mud pump 28 may pump the drilling fluid 20d from the pit 29, through a standpipe and mud hose of the supply line 32 to the top drive 4. The drilling fluid 20d may flow from the supply line 32 and into the drill string 5 via the top drive 4. The drilling fluid 20d may be pumped down through the drill string 5 and exit the drill bit 10, where the fluid may circulate the cuttings away from the bit and return the cuttings up an annulus 33 formed between an inner surface of the inner casing 26 or wellbore 24 and an outer surface of the drill string 5. The returns 20r (drilling fluid plus cuttings) may flow up the annulus 33 to the wellhead 22 and exit the wellhead at the flow cross. The returns 20r may continue through the return line 31 and into the shale shaker 30 and be processed thereby to remove the cuttings, thereby completing a cycle. As the drilling fluid 20d and returns 20r circulate, the drill string 5 may be rotated 11r by the top drive 4 and lowered 11a by the traveling block 12t, thereby extending the wellbore 24 into the lower formation 27b.

Figures 3A, 3B, 3C:
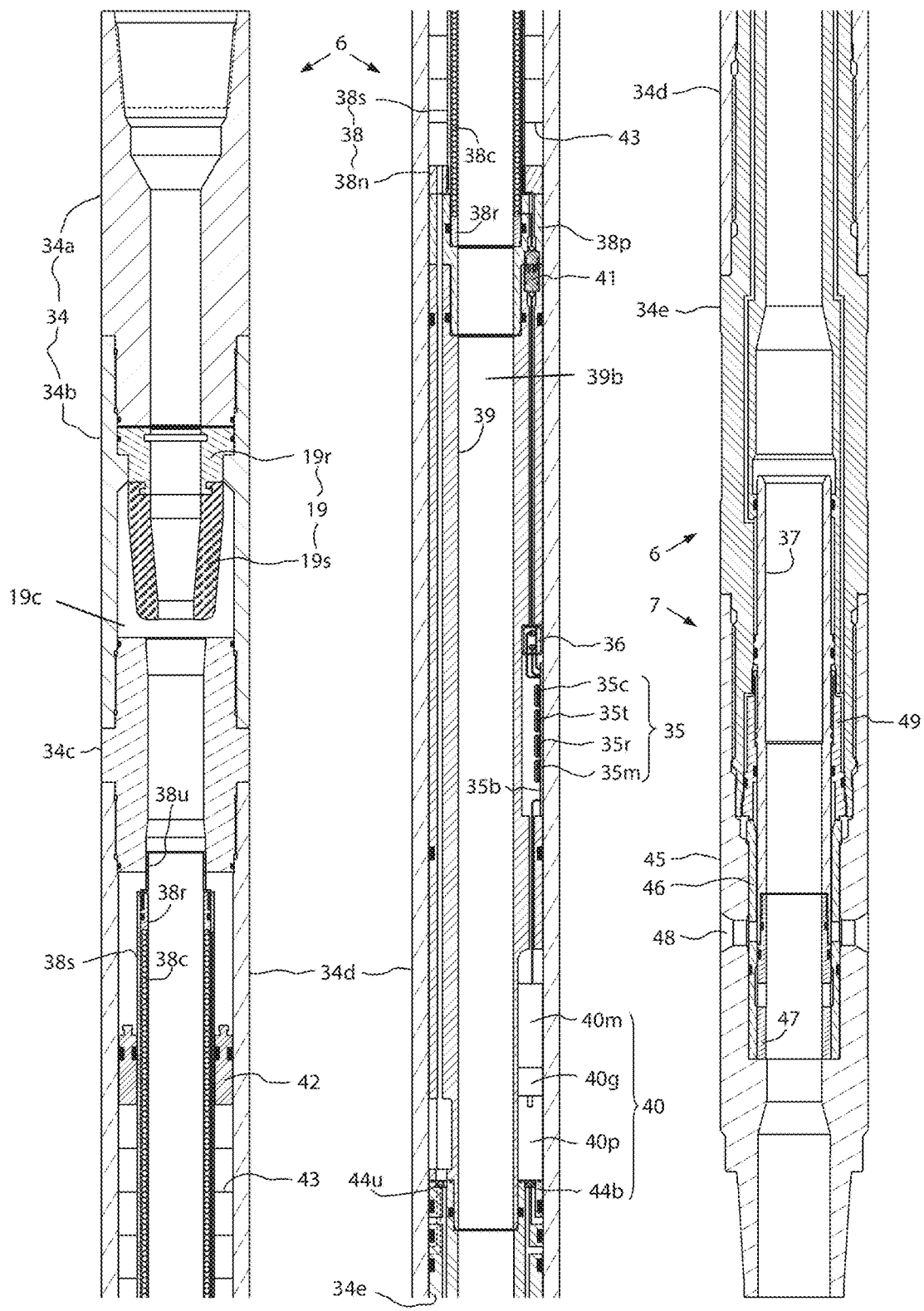
FIGS. 3A-3C illustrate a control sub and a circulation sub of the drilling system.

FIGS. 3A-3C illustrate an example control sub 6 and an example downhole tool, namely circulation sub 7. The control sub 6 may include the stop 19, a housing 34, an electronics package 35, an electrical power source, such as a battery 36, a piston 37, an antenna 38, a mandrel 39, and an actuator 40. The bore 39b of the control sub 6 may be within the mandrel 39. The housing 34 may include two or more tubular sections 34a-e connected to each other, such as by threaded couplings. The housing 34 may have couplings, such as threaded couplings, formed at each longitudinal end thereof for connection to the tubular string 5s at an upper end thereof and the circulation sub 7 at a lower end thereof. The housing 34 may have a pocket formed between a fourth section 34d and the lower section 34e for receiving the antenna 38 and the mandrel 39. As may be recognized by those skilled in the pertinent art based on the teachings herein, the tag delivery system of the present disclosure may employ a variety of control subs and downhole tools, which may take any of numerous different shapes or configurations.

The stop 19 may include a retainer 19r and a seat 19s. The retainer 19r may include a metal or alloy and the seat 19s may include a flexible material, such as rubber or an elastomer or elastomeric copolymer. The retainer 19r may be connected to the housing 34 by entrapment of an upper portion thereof between a bottom of the upper housing section 34a and a shoulder formed in an inner surface of the second housing section 34b. The seat 19s may be fitted or molded to a lower portion of the retainer 19r. The seat 19s may have cylindrical upper and lower portions and a conical mid portion extending between the upper and lower portions. The upper portion of the seat 19s may have a larger inner diameter than the lower portion thereof and the conical portion may converge from the upper portion to the lower portion to accommodate the difference in diameters between the upper and lower portions.

The inner diameter of the seat upper portion may be greater than the outer diameter of the ball stud 15b, and the inner diameter of the seat lower portion may be less than the outer diameter of the ball stud 15b, such that the ball stud 15b may be caught in the seat conical portion (FIG. 5B) as the dart 15 is pumped through the control sub 6. As used herein, to be caught includes both slowing as well as coming to a complete halt. In other words, when the catch element of a tag carrier is caught by a stop 19, progress of the tag carrier downhole through the bore of the control sub 6 is slowed sufficiently for reliable transmission of a command signal from the RFID tag 16 on the tag carrier to the control sub 6 of the stop. A length of the dart 15 may correspond to a distance between the seat 19s and the antenna 38 such that the RFID tag 16 is aligned with the antenna 38 when the dart is caught in the seat. A seat chamber 19c may be formed in an inner surface of the second housing section 34b to accommodate expansion of the seat 19s during passage of the dart 15 therethrough. A stiffness of the seat 19s may be sufficient to absorb kinetic energy of the dart 15 as the dart is being pumped through the tubular string 5s, thereby slowing or halting advancement of the dart (and the RFID tag 16). In some embodiments, the seat 19s may be configured so that the outer surface of the seat 19s does not significantly deform when the ball stud 15b is caught. For example, the stiffness of the seat 19s may increase radially, such that when the ball stud 15b is caught, the inner surface of the seat 19s compresses to absorb the impact, while the outer surface of seat 19s remains relatively fixed. In such embodiments, the seat chamber 19c may be only narrowly larger than the outer surface of seat 19s. In some embodiments, two or more seats 19s may be used in a stop 19. In some embodiments, two or more stops 19 may be used in a control sub 6.

Advantageously, slowing or halting of the RFID tag 16 may allow for the control sub 6 to have a shorter antenna 38 than would otherwise be needed if the tag were traveling through the control sub 6 at a significant speed. The antenna 38 may have a length less than or equal to about five feet (about one hundred fifty-two centimeters), such as less than or equal to about three feet (about ninety-one centimeters) or less than or equal to about two feet (about sixty-one centimeters). The antenna length may also be greater than or equal to a length of the RFID tag 16. Further, having the orientation of the RFID tag 16 and the centralized position fixed by the dart 15 also allows confidence in using only one RFID tag to transmit a command signal to the control sub 6, instead of otherwise having to launch several tags and relying on probability to ensure that one of the tags will be in the proper orientation and centralized position. The longitudinal axis of the RFID tag 16 may vary by +/−45 degrees from parallel with the longitudinal axis of the tubular string 5s to provide for more reliable transmission of command signals.

Alternatively, the seat 19s may include a malleable, ductile, and/or resilient metal or alloy, such as brass. The alternative metallic seat may be seamless or have a longitudinal seam weld (not shown). The alternative metallic seat may have a thin wall thickness such that the seat is pliable to longitudinally, radially, and/or circumferentially expand for passage of the dart 15 therethrough. The thin seat wall thickness may be equal to a thickness of sheet metal (six thousandths of an inch to twenty-four hundredths of an inch or two to six tenths of a millimeter) or foil (one to five thousandths of an inch or three to thirteen hundredths of a millimeter). Alternatively, the seat 19*s* may include a plurality of segments to mechanically actuate from the expanded position to the contracted position.

The antenna 38 may include an inner sleeve 38*r*, a coil 38*c*, an outer sleeve 38*s*, a nut 38*n*, an upper sleeve 38*u*, and a plug 38*p*. The inner sleeve 38*r* may include a non-magnetic and non-conductive material, such as a polymer or composite, may have a bore formed longitudinally therethrough, and may have a helical groove formed in an outer surface thereof. The coil 38*c* may be wound in the helical groove and made from an electrically conductive material, such as copper or an alloy thereof. The outer sleeve 38*s* may include the non-magnetic and non-conductive material and may insulate the coil 38*c*. A seal may be disposed in an upper interface of the inner sleeve 38*r* and the outer sleeve 38*s*. The nut 38*n*, upper sleeve 38*u*, and the plug 38*p* may each include the non-magnetic and non-conductive material. The plug 38*p* may receive ends of the coil 38*c*.

The upper sleeve 38*u* of the antenna may be connected to the inner sleeve 38*r*, such as by a threaded connection, and be received in a receptacle formed in an inner surface of the third housing section 34*c*. The nut 38*n* may be connected to the outer sleeve 38*s*, such as by a threaded connection, and the antenna plug 38*p* may be connected to the inner sleeve 38*r*, such as one or more threaded fasteners (not shown). A seal may be disposed in an interface of the inner sleeve 38*r* and the plug 38*p*. The plug 38*p* may have an electrical conduit formed therethrough for receiving the coil ends and a recess for housing an electric plug and receiving an electric socket 41 disposed in an upper end of the mandrel 39. A seal may be disposed in an interface of the mandrel 39 and the plug 38*p*. A balance piston 42 may be disposed in a reservoir chamber formed between the fourth housing section 34*d* and the outer antenna sleeve 38*s* and may divide the chamber into an upper portion and a lower portion. One or more ports of the upper sleeve 38*u* may provide fluid communication between the reservoir chamber upper portion and a bore of the control sub 6. Hydraulic fluid, such as refined and/or synthetic oil 43, may be disposed in the reservoir chamber lower portion. The balance piston 42 may carry inner and outer seals for isolating the hydraulic oil 43 from the bore of the control sub 6. Each of the nut 38*n* and the plug 38*p* may have a hydraulic passage formed therethrough.

The mandrel 39 may be a tubular member having one or more recesses formed in an outer surface thereof. The mandrel 39 may be connected to the fourth housing section 34*d*, such as by one or more threaded fasteners (not shown). The mandrel 39 may have electrical conduits formed in a wall thereof for receiving lead wires connecting the socket 41 to the electronics package 35, and for connecting the battery 36 to the electronics package 35. The mandrel 39 may also have a hydraulic passage formed therethrough for providing fluid communication between the reservoir and the actuator 40. One or more seals may be disposed in an interface between the fourth housing section 34*d* and the mandrel 39. The mandrel 39 may have another electrical conduit formed in the wall thereof for receiving lead wires connecting the electronics package 35 to the actuator 40.

The electronics package 35 and battery 36 may be disposed in respective recesses of the mandrel 39. The electronics package 35 may include a control circuit 35*c*, a transmitter 35*t*, a receiver 35*r*, and a motor controller 35*m* integrated on a printed circuit board 35*b*. The control circuit 35*c* may include a microcontroller (MCU), a memory unit (MEM), a clock, and an analog-digital converter. The transmitter 35*t* may include an amplifier (AMP), a modulator (MOD), and an oscillator (OSC). The receiver 35*r* may include an amplifier (AMP), a demodulator (MOD), and a filter (FIL). The motor controller 35*m* may include an inverter for converting DC power supplied by the battery 36 into suitable power for driving an electric motor 40*m* of the actuator 40.

The actuator 40 may include the electric motor 40*m*, a gearbox 40*g*, a pump 40*p*, one or more control valves 44*u,b*, and one or more pressure sensors (not shown). The electric motor 40*m* may include a stator in electrical communication with the motor controller 35*m* and a rotor in electromagnetic communication with the stator for being torsionally driven thereby. The gearbox 40*g* may have an input shaft torsionally connected to the rotor. The pump 40*p* may have a stator connected to the motor stator and a head connected to an output shaft of the gearbox 40*g* for being driven thereby. The pump head may be longitudinally or torsionally driven. The pump 40*p* may have an inlet in fluid communication with the mandrel hydraulic passage and an outlet in fluid communication with a first control valve 44*u*. The second control valve 44*b* may also be in fluid communication with the mandrel hydraulic passage.

The circulation sub 7 may include a housing 45, a liner sleeve 46, a valve sleeve 47, and one or more (pair shown) circulation ports 48. The housing 45 may be tubular and may have couplings, such as threaded couplings, formed at each longitudinal end thereof for connection to the control sub 6 at an upper end thereof and the catcher 8 at a lower end thereof.

The piston 37 may be disposed in the lower housing section 34*e* and the housing 45, and may be longitudinally movable relative thereto between an upper position (FIG. 6A) and a lower position (FIG. 3C). The piston 37 may be stopped in the lower position against a shoulder formed in an inner surface of the housing 45. The circulation ports 48 may be formed through a wall of the housing 45. The liner sleeve 46 may be disposed between the piston 37 and the housing 45. The liner sleeve 46 may have one or more ports formed therethrough in alignment with the circulation ports 48. The liner sleeve 46 may include an erosion resistant material, such as a metal, alloy, ceramic, or cermet. A seal may be disposed in an interface between the liner sleeve 46 and the housing 45.

The valve sleeve 47 may be connected to a lower end of the piston 37, such as by threaded couplings. A seal may be disposed in the interface between the valve sleeve 47 and the piston 37. The valve sleeve 47 may have one or more ports formed therethrough and corresponding to the circulation ports 48. The valve sleeve 47 may also carry a seal adjacent to the ports thereof and in engagement with an inner surface of the liner sleeve 46. The valve sleeve/piston interface may cover the liner ports when the piston 37 is in the lower position, thereby closing the circulation ports 48, and the valve sleeve ports may be aligned with the circulation ports when the piston is in the upper position, thereby opening the circulation ports.

The control sub 6 may further include a detent 49 disposed between the housing 34 and the piston 37 and connected to a lower end of the lower housing section 34*e*, such as by threaded couplings. A seal may be disposed in an inner surface of the detent 49 in engagement with an outer surface of the piston 37. A seal may be disposed in an interface between the lower housing section 34*e* and the detent 49 and may serve as a lower end of an actuation chamber. A shoulder formed in an outer surface of the piston 37 may be disposed in the actuation chamber and carry a seal in engagement with an inner surface of the lower housing section 34e. The piston shoulder may divide the actuation chamber into an opener portion and a closer portion. A shoulder formed in an inner surface of the lower housing section 34e may have a seal in engagement with an outer surface of the piston 37 and may serve as an upper end of the actuation chamber. Collet fingers may be formed in an upper end of the detent 49. The piston 37 may have a detent profile formed in an outer surface thereof complementary to the collet fingers. Engagement of the fingers with the detent profile may stop the piston 37 in the upper position.

Each end of the actuation chamber may be in fluid communication with a respective control valve 44u,b via a respective hydraulic passage formed in a wall of the lower housing section 34e. Each control valve 44u,b may also be in fluid communication with an opposite hydraulic passage via a crossover passage. The control valves 44u,b may each be electronically actuated, such as by a solenoid, and together may provide selective fluid communication between an outlet of the pump and the opener and closer portions of the actuation chamber while providing fluid communication between the reservoir chamber and an alternate one of the opener and closer portions of the actuation chamber. Each control valve actuator may be in electrical communication with the MCU of the control circuit 35c for control thereby. A pressure sensor may be in fluid communication with the reservoir chamber and another pressure sensor may be in fluid communication with an outlet of the pump 40p and each pressure sensor may be in electrical communication with the MCU to indicate when the piston 37 has reached the respective upper and lower positions by detecting a corresponding pressure increase at the outlet of the pump.

FIGS. 4A, 4B, 4C, and 4D illustrate the dart 15 and the RFID tag 16. The RFID tag 16 may be a passive tag and include an electronics package and one or more antennas disposed in a non-metallic cylinder having ends closed by caps. The electronics package may include a memory unit, a transmitter, and a radio frequency power generator for operating the transmitter. The RFID tag 16 may be programmed with a command for the circulation sub 6, such as to shift to the next position. The RFID tag 16 may be operable to transmit the command signal 50c (FIG. 5B), such as a digital electromagnetic command signal (that may include identification information), to the antenna 38 in response to receiving an activation signal 50a (FIG. 5B) therefrom. The MCU of the control circuit 35c may receive the command signal 50c and operate the actuator 40 in response to receiving the command signal.

Figure 4E:
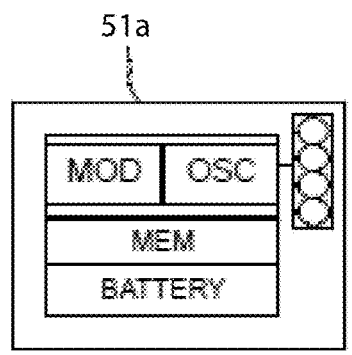
FIG. 4E illustrates an alternative active tag for use with the tag delivery system, according to another embodiment of the present disclosure.
Figure 4F:
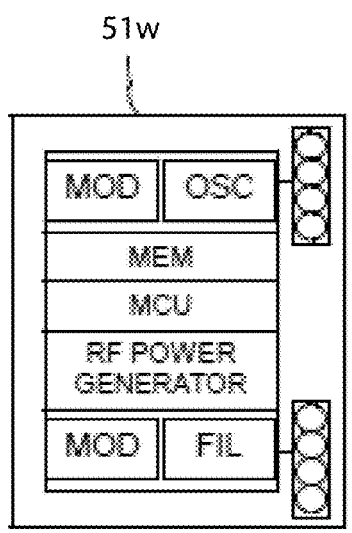
FIG. 4F illustrates an alternative wireless identification and sensing platform tag for use with the tag delivery system, according to another embodiment of the present disclosure.

FIG. 4F illustrates an alternative wireless identification and sensing platform (WISP) tag 51w for use with the tag delivery system 2, according to another embodiment of the present disclosure. Alternatively, the RFID tag 16 may be a WISP tag 51w. The WISP tag 51w may further include a microcontroller (MCU) and a receiver for being programmable at the surface 25. Suitable WISP tags may be selected from a family of sensors that are powered and/or read by ultra-high frequency RFID readers. WISP tags may not require batteries, being capable of harvesting power from the radio frequency signal generated by the reader. For example, a suitable WISP tag may be an open source, open architecture EPC Class 1 Generation 2 RFID tag that includes a fully programmable 16 bit microcontroller, as well as arbitrary sensors.

FIG. 4E illustrates an alternative active tag 51a for use with the tag delivery system 2, according to another embodiment of the present disclosure. Alternatively, the RFID tag 16 may be an active tag 51a having an onboard battery powering a transmitter instead of having the radio frequency power generator, or the WISP tag 51w may have an onboard battery for assisting in data handling functions.

FIGS. 5A-5D illustrate an example operation of the tag delivery system 2. Referring specifically to FIG. 5A, periodically, during or after drilling of the wellbore 24, it may be desirable to perform a downhole operation, such as a cleanout operation to clear the annulus 33 of cuttings. The cleanout operation may involve rotation 11r of the drill string 5 at a high angular velocity and circulation through the annulus 33 at a flow rate greater than what is capable through the drill bit 10. In preparation of the cleanout operation, a technician may operate the tag carrier launcher 14 via the control console 17. This may provide an additional safety mechanism in embodiments wherein the control console 17 is located remotely from the drilling rig 1r. The dart 15 may be released and propelled into the tubular string 5s by drilling fluid 20d pumped by the mud pump 28.

Referring specifically to FIG. 5B, the tag carrier may travel down the tubular string 5s and into the control sub 6 until the catch element is caught by the seat 19s. For example, the dart 15 may travel down the tubular string 5s and into the control sub 6 until the ball stud 15b is caught by the seat 19s. The RFID tag thereby may be aligned with the antenna when the tag carrier is caught by the seat. The RFID tag 16 may receive the activation signal 50a from the antenna 38 and reply by transmitting the command signal 50c thereto. In the illustrated embodiment, the MCU of the control circuit 35c may operate the actuator 40 to shift the valve sleeve 47 upward to the open position, facilitating the cleanout operation. Continued pumping of the drilling fluid 20d against the stopped dart 15 may increase pressure 52 in the bore of the tubular string 5s. The increase in pressure 52 may be detected at the surface 25 by monitoring the pressure gauge 21.

Referring specifically to FIG. 5C, the pressure 52 exerted on the ball stud 15b may increase until a threshold pressure is achieved, thereby passing the dart 15 through the seat 19s by expansion of the seat, to allow passage of the dart therethrough. Referring specifically to FIG. 5D, once the ball stud 15b has passed through the seat 19s, the pressure 52 may decrease, and the dart 15 may resume downward travel through the control sub 6 and the circulation sub 7. The outer diameter of the ball stud 15b may be less than a diameter of the antenna inner sleeve 38r to prevent damage to the antenna 38 as the ball stud 15b passes therethrough.

FIG. 6A illustrates a cleanout operation being performed using the circulation sub 7. The catcher 8 may include a tubular housing, a tubular cage, and a baffle. The catcher housing may have threaded couplings formed at each longitudinal end thereof for connection with the circulation sub 7 at an upper end thereof and the drill collars 9 at a lower end thereof. The catcher housing may have a longitudinal bore formed therethrough for passage of the drilling fluid 20d therethrough. An inner surface of the catcher housing may have an upper and lower shoulder formed therein.

The catcher cage may be disposed within the catcher housing and connected thereto, such as by being disposed between the lower housing shoulder and a fastener, such as a ring, connected to the housing, such as by a threaded connection. The catcher cage may include an erosion resistant material, such as a tool steel or cermet, or include a metal or alloy and treated, such as a case hardened, to resist erosion. The retainer ring may engage the upper housing shoulder. The catcher cage may have solid top and bottom and a perforated body, such as slotted. The slots may be formed through a wall of the body and spaced therearound. A length of the catcher cage may correspond to a capacity of the catcher 8 and may be sized to catch a plurality of darts 15 so that the circulation sub 7 may be repeatedly actuated between the positons. The baffle may be fastened to the body, such as by one or more fasteners (not shown). An annular flow passage may be formed between the body and the housing. The annular flow passage may serve as a bypass for the flow of the drilling fluid 20*d* through the catcher 8.

The dart 15 may continue downward travel through the BHA 5*b* until the dart lands on the baffle. The drilling fluid 20*d* may enter the annular flow passage from the housing bore through the slots, flow around the caught dart 15 and along the annulus, and re-enter the housing bore thorough the slots below the baffle. The cleanout operation may commence once the circulation sub 7 has opened. Once the cleanout operation has concluded, a second dart (not shown) carrying a second RFID tag may be launched and pumped down the tubular string 5*s* to command the control sub 6 to close the circulation ports 48 for the resumption of drilling.

FIG. 6B illustrates an arrival sensor 54 for the tag delivery system, according to another embodiment of the present disclosure. An alternative stop 53 may include a modified retainer 53*r*, the seat 19*s*, and the arrival sensor 54. The modified retainer 53*r* may include a metal or alloy. The modified retainer 53*r* may be linked to a modified housing 55 by entrapment of an upper portion thereof between a bottom of the upper housing section 34*a* and a shoulder formed in an inner surface of a modified second housing section 55*b*. The seat 19*s* may be fitted or molded to a lower portion of the modified retainer 53*r*. The arrival sensor 54 may include a pair of switch rings 54*a,b*, a bridge ring 54*c*, and a spring 54*s*, such as a compression spring.

A distance between the bottom of the upper housing section 34*a* and the shoulder of the modified second housing section 55*b* may be greater than a length of an enlarged upper portion of the modified retainer 53*r*, thereby providing room to accommodate longitudinal movement of the modified retainer between an upper position (shown) and a lower position (not shown). A chamber may be formed between the shoulder of the modified second housing section 55*b* and a shoulder of the modified retainer 53*r*. The spring 54*s* may be disposed in the chamber and have an upper end pressing against the shoulder of the modified retainer 53*r* and a lower end pressing against the shoulder of the modified second housing section 55*b*, thereby biasing the modified retainer toward the upper position.

The switch rings 54*a,b* may be disposed in respective grooves formed in the inner surface of the modified second housing section 55*b* adjacent to the chamber. The switch rings 54*a,b* may be spaced apart by a distance preventing electrical communication therebetween. The modified housing 55 may have electrical conduits formed in a wall thereof for receiving lead wires connecting the switch rings 54*a,b* to the electronics package 35 and contact rings for providing electrical communication across joints between the housing sections. The bridge ring 54*c* may be disposed in a groove formed in an outer surface of the enlarged portion of the modified retainer 53*r*. The bridge ring 54*c* may have a length corresponding to the distance between the switch rings 54*a,b*. The bridge ring 54*c* may be clear of the switch rings 54*a,b* when the modified retainer is in the upper position and aligned with the switch rings when the modified retainer is in the lower position.

In operation, the MCU of the control circuit 35*c* may supply a voltage to the switch rings 54*a,b* and monitor the circuit thereof for current flow. The force exerted on the landed dart 15 by the increased pressure 52 may drive the modified retainer 53*r* from the upper position to the lower positon, thereby aligning the bridge ring 54*c* with the switch rings 54*a,b*, closing the circuit therebetween, and allowing current to flow. The MCU may detect the current flow and activate the antenna 38 in response to the detected current flow, thereby conserving life of the battery 36. Once the dart 15 has passed through the seat 19*s*, the spring 54*s* may return the modified retainer 53*r* to the upper position, thereby opening the circuit between the switch rings 54*a,b*. The MCU may shut off electrical power to the antenna 38 in response to detecting loss of current flow.

Alternatively, the switch rings 54*a,b* may be electrically connected in series between the antenna 38 and the electronics package 35. Alternatively, the arrival sensor 54 may be a pressure sensor in fluid communication with a bore of the upper housing section 34*a* or the retainer 19*r*.

FIG. 6C illustrates an alternative arrival sensor 91 for the tag delivery system, according to another embodiment of the present disclosure. An alternative stop 92 may include the retainer 19*r*, a modified seat 92*s*, and a pair of switch ring segments 94*a,b* embedded in an inner surface of the modified seat. Lead wires may extend from the modified seat 92*s* into a modified housing 93 having electrical conduits formed in a wall thereof. The lead wires may connect the switch ring segments 94*a,b* to the electronics package 35, and the modified housing 93 may have contact rings for providing electrical communication across joints between the housing sections. A modified dart 95 may carry the bridge ring 54*c* in an outer surface of the ball stud 15*b*.

In operation, the MCU of the control circuit 35*c* may supply a voltage to the switch ring segments 94*a,b* and monitor the circuit thereof for current flow. Landing of the modified dart 95 into the modified seat 92*s* may align the bridge ring 54*c* with the switch ring segments 94*a,b*, thereby closing the circuit therebetween and allowing current to flow. The MCU may detect the current flow and activate the antenna 38 in response to the detected current flow, thereby conserving life of the battery 36. Passing of the modified dart 95 through the modified seat 92*s* may open the circuit between the switch ring segments 94*a,b*. The MCU may shut off electrical power to the antenna 38 in response to detecting loss of current flow.

Alternatively, the switch ring segments 94*a,b* may be electrically connected in series between the antenna 38 and the electronics package 35.

Figure 7A:
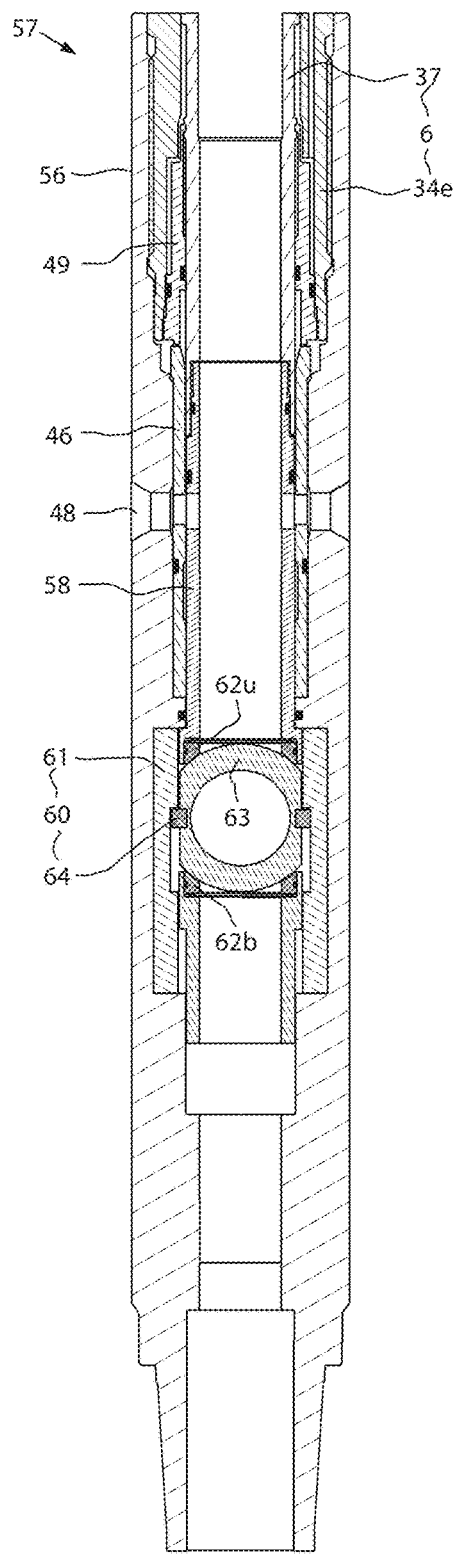
FIG. 7A illustrates an alternative circulation sub, according to another embodiment of the present disclosure.

FIG. 7A illustrates an alternative downhole tool, such as alternative circulation sub 57, according to another embodiment of the present disclosure. The alternative circulation sub 57 may include a housing 56, the liner sleeve 46, a valve sleeve 58, the circulation ports 48, and a bore valve 60. The housing 56 may be tubular and may have couplings, such as threaded couplings, formed at each longitudinal end thereof for connection to the control sub 6 at an upper end thereof and a shoe 59 (FIG. 7B) at a lower end thereof.

The valve sleeve 58 may be connected to a lower end of the piston 37, such as by threaded couplings. A seal may be disposed in the interface between the valve sleeve 58 and the piston 37. The valve sleeve 58 may have one or more ports formed therethrough and corresponding to the circulation ports 48. The valve sleeve 58 may also carry a seal adjacent to the ports thereof and in engagement with an inner surface of the liner sleeve 46. The valve sleeve/piston interface may cover the liner ports when the piston 37 is in the lower position, thereby closing the circulation ports 48, and the valve sleeve ports may be aligned with the circulation ports when the piston is in the upper position, thereby opening the circulation ports.

The piston 37 may be stopped in the lower position by the bore valve 60. The bore valve 60 may be operable between an open position (FIG. 8B) and a closed position (FIG. 7A) by interaction with the valve sleeve 58. In the open position, the bore valve 60 may allow flow through the alternative circulation sub 57 to the shoe 59. In the closed position, the bore valve 60 may close the circulation sub bore below the circulation ports 48, thereby preventing flow to the shoe 59 and diverting all flow through the circulation ports. The bore valve 60 may be operably coupled to the valve sleeve 58 such that the bore valve is open when the circulation ports 48 are closed and the bore valve is closed when the circulation ports are open.

The bore valve 60 may include a cam 61, upper 62u and lower 62b seats, and a valve member, such as a ball 63. The cam 61 may be connected to the housing 56 by being trapped within a recess formed therein. Each seat 62u,b may be disposed between the valve sleeve 58 and the ball 63 and biased into engagement with the ball by a respective spring disposed between the respective seat and the valve sleeve. The ball 63 may be longitudinally connected to the valve sleeve 58 by being trapped in openings formed through a wall thereof. The ball 63 may be disposed within the cam 61 and may be rotatable relative thereto between an open position and a closed position by interaction with the cam. The ball 63 may have a bore therethrough corresponding to the piston/sleeve bore and aligned therewith in the open position. A wall of the ball 63 may isolate the shoe 59 from the alternative circulation sub 57 in the closed position. The cam 61 may interact with the ball 63 by having a cam profile, such as slots, formed in an inner surface thereof. The ball 63 may carry corresponding followers 64 in an outer surface thereof and engaged with respective cam profiles or vice versa. The ball-cam interaction may rotate the ball 63 between the open and closed positions in response to longitudinal movement of the ball relative to the cam 61.

Figure 7B:
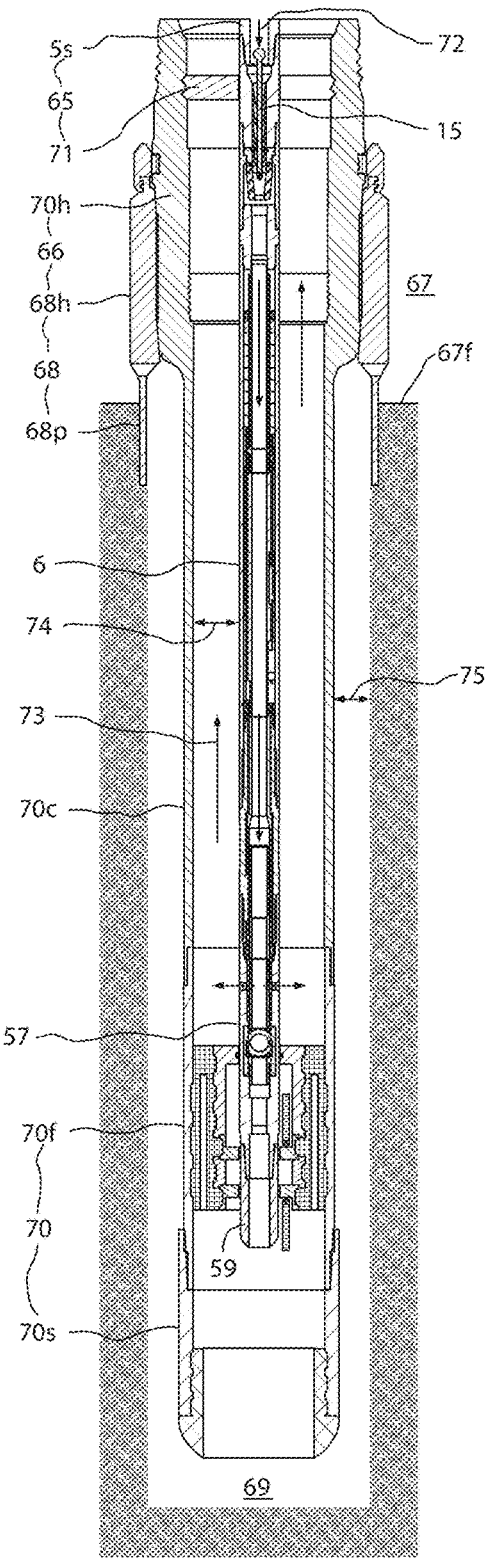

FIGS. 7B-9B illustrate an inner string cementing operation performed using the control sub 6 and the alternative circulation sub 57. Referring specifically to FIG. 7B, the control sub 6 and the alternative circulation sub 57 may be part of a tubular string, such as work string 65 of an offshore drilling system (rest not shown). The work string 65 may further include the tubular string 5s, the shoe 59, and a running tool 71. The offshore drilling system may further include an offshore drilling unit, a drilling rig, a fluid handling system, and the tag delivery system 2. The drilling rig may be similar to the (terrestrial) drilling rig 1r except for the addition of a cementing swivel connected between the (hydraulic) swivel 13 and the tag carrier launcher 14. The fluid handling system may be similar to the (terrestrial) fluid handling system 1r except for the addition of a cement blender and a cement pump having an outlet connected to a cementing swivel and an inlet connected to the blender.

The offshore drilling unit may be positioned over a wellhead 66 located adjacent to a floor 67f of the sea 67. A tubular string 68 has been driven into the seafloor 67f. The tubular string 68 may include an outer wellhead housing 68h and joints of conductor pipe 68p connected together, such as by threaded couplings. Once the tubular string 68 has been set, a subsea wellbore 69 may be drilled into the seafloor 67f, and the work string 65 may be used to deploy a surface tubular string, such as casing string 70 into the wellbore 69. During deployment of the surface casing string 70, the alternative circulation sub 57 may be in a deployment position having the circulation ports 48 open and the bore valve 60 closed. The surface casing string 70 may include an inner wellhead housing 70h, joints of casing 70c connected together, such as by threaded couplings, a float collar 70f, and a shoe 70s.

The float collar 70f may include a tubular housing, a shutoff valve, a receptacle, and a bonding material. Inner components of the float collar 70f and shoe 70s may include a drillable material, such as cement, non-ferrous metal or alloy, polymer, or fiber reinforced composite. The shutoff valve may include a pair of oppositely oriented check valves, such as an upward opening flapper valve and a downward opening flapper valve, arranged in series. Each flapper valve may include a body and a flapper pivotally connected to the body and biased toward a closed position, such as by a torsion spring (not shown). The flapper valves may be separated by a spacer and the opposed arrangement of the unidirectional flapper valves may provide bidirectional capability to the shutoff valve. The flapper valves may be propped open by the shoe 59 and/or housing 56 and the receptacle may have a shoulder carrying a seal for engaging an outer surface of the shoe 59 or housing 56, thereby isolating an interface between the work string 65 and the surface casing string 70. Once the work string 65 is removed from the surface casing string 70 (FIG. 9B), the flappers may close to isolate a bore of the surface casing string from the wellbore 69.

The inner wellhead housing 70h may land in the outer wellhead housing 69h during deployment of the surface casing string 70 into the wellbore 69, thereby forming the subsea wellhead 66. Once the surface casing string 70 has landed, a technician may operate the tag carrier launcher 14 via the control console 17. The cement pump may then be operated and the dart 15 may be released and propelled into the tubular string 5s by cement slurry 72 pumped through the cementing swivel.

Once the desired quantity of cement slurry 72 has been pumped, chaser fluid (not shown) may be pumped into the cementing swivel by the cement pump. Pumping of the chaser fluid may be switched to the mud pump once the cement line has been purged. The dart 15 and cement slurry 72 may pass through the work string 65 by the chaser fluid. Seawater 73 displaced from the work string 65 may exit the circulation ports 48 and flow up an inner annulus 74 formed between the work string 65 and the surface casing string 70 and be discharged into the sea 67. The closed bore valve 60 may prevent the displaced seawater 73 from flowing through the shoes 59, 70s and up an outer annulus 75 formed between the surface casing string 70 and the wellbore 69 which could otherwise washout the outer annulus. Washout of the outer annulus 75 may lower the final cement level in the outer annulus by increasing the volume thereof, thereby compromising the integrity of the cement sheath.

Figures 8A, 8B:
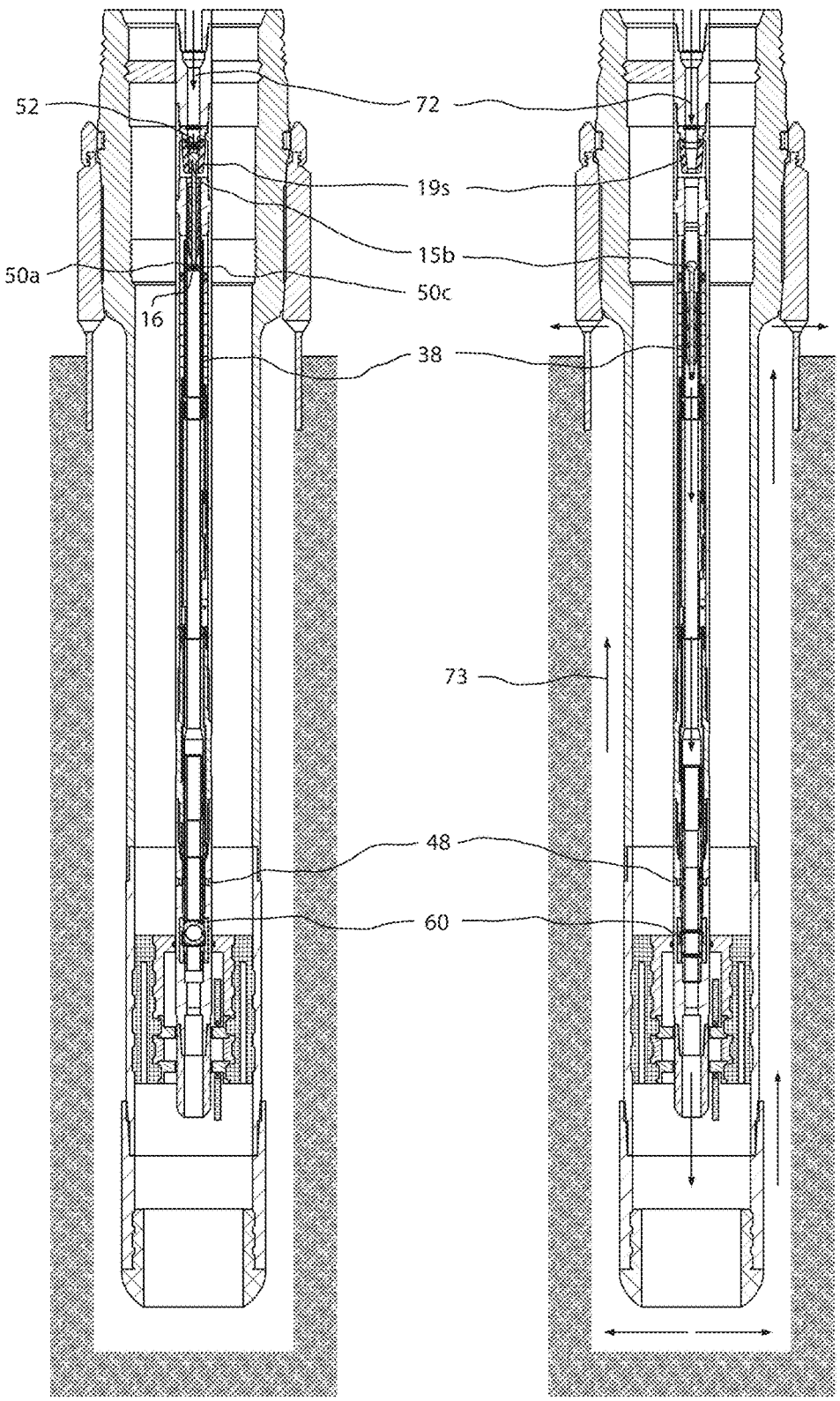

Referring specifically to FIG. 8A, the dart 15 may travel down the tubular string 5s and into the control sub 6 until the ball stud 15b is caught by the seat 19s. The RFID tag thereby may be aligned with the antenna when the ball stud 15b of the dart is caught by the seat. The RFID tag 16 may receive the activation signal 50a from the antenna 38 and reply by transmitting the command signal 50c thereto. Referring specifically to FIG. 8B, the MCU of the control circuit 35c may operate the actuator 40 to shift the valve sleeve 58 downward to close the circulation ports 48 and open the bore valve 60. Continued pumping against the stopped dart 15 may increase the pressure 52 in the bore of the tubular string 5s exerted on the ball stud 15b until the threshold pressure is achieved, thereby passing the dart through the seat 19s to allow passage of the dart therethrough.

Referring specifically to FIG. 9A, once the ball stud 15b has passed through the seat 19s, the pressure 52 may decrease and the dart 15 may resume downward travel through the control sub 6 and the alternative circulation sub 57 until reaching a bottom of the wellbore 69. The cement slurry 72 may follow the dart 15 through the open bore valve 60 and the shoes 59, 70s and up the outer annulus 75. Pumping of the chaser fluid may continue until a top of the cement slurry 72 reaches a desired level in the outer annulus 75 adjacent to the tubular string 68.

Referring specifically to FIG. 9B, pumping of the chaser fluid may then be halted and the running tool 71 may be released from the inner wellhead housing 70h. The work string 65 may be retrieved to the rig, thereby removing the alternative circulation sub 57 and/or shoe 59 from obstructing closure of the float collar 70f. The float collar 70f may then close to prevent backflow of the cement slurry 72 into a bore of the surface casing string 70.

Alternatively, the rig may include a second tag carrier launcher for launching a second dart into the tubular string 5s after the cement slurry 72 has been pumped and before the chaser fluid is pumped. The second dart may separate the cement slurry 72 from the chaser fluid. The second dart may be similar to the (first) dart 15 except for omission of the RFID tag 16. Landing of the second dart in the seat may be detected at the rig and used as an indication that the time to stop pumping of the chaser fluid is imminent.

FIG. 9C illustrates a cementing operation being performed using a first alternative tag delivery system. The first alternative tag delivery system may be similar to the tag delivery system 2 except for including a lead dart 96d, a trail dart 96t, and a second tag carrier launcher (not shown). Each dart 96d,t may be similar to the dart 15. The second tag carrier launcher may be similar to the tag carrier launcher 14 except for omission of the deflector. The second tag carrier launcher may be connected between the tag carrier launcher 14 and the tubular string 5s and the swivel 13 may have a second inlet and outlet for operation of the second tag carrier launcher. The darts 96d,t may be employed in a cementing operation for subsea tubular strings, such as a subsea casing string or a liner string. The lead dart 96d may be launched into the tubular string 5s after the annulus has been cleaned by conditioner 97c. A quantity of cement slurry 72 may then be pumped into the tubular string 5s. The trail dart may be launched into the tubular string 5s behind the cement slurry 72 and the train 72, 96d,t may pass through the tubular string 5s by pumping chaser fluid 97h into the tubular string behind the trail dart 96t.

Figures 10A, 10B, 10C:
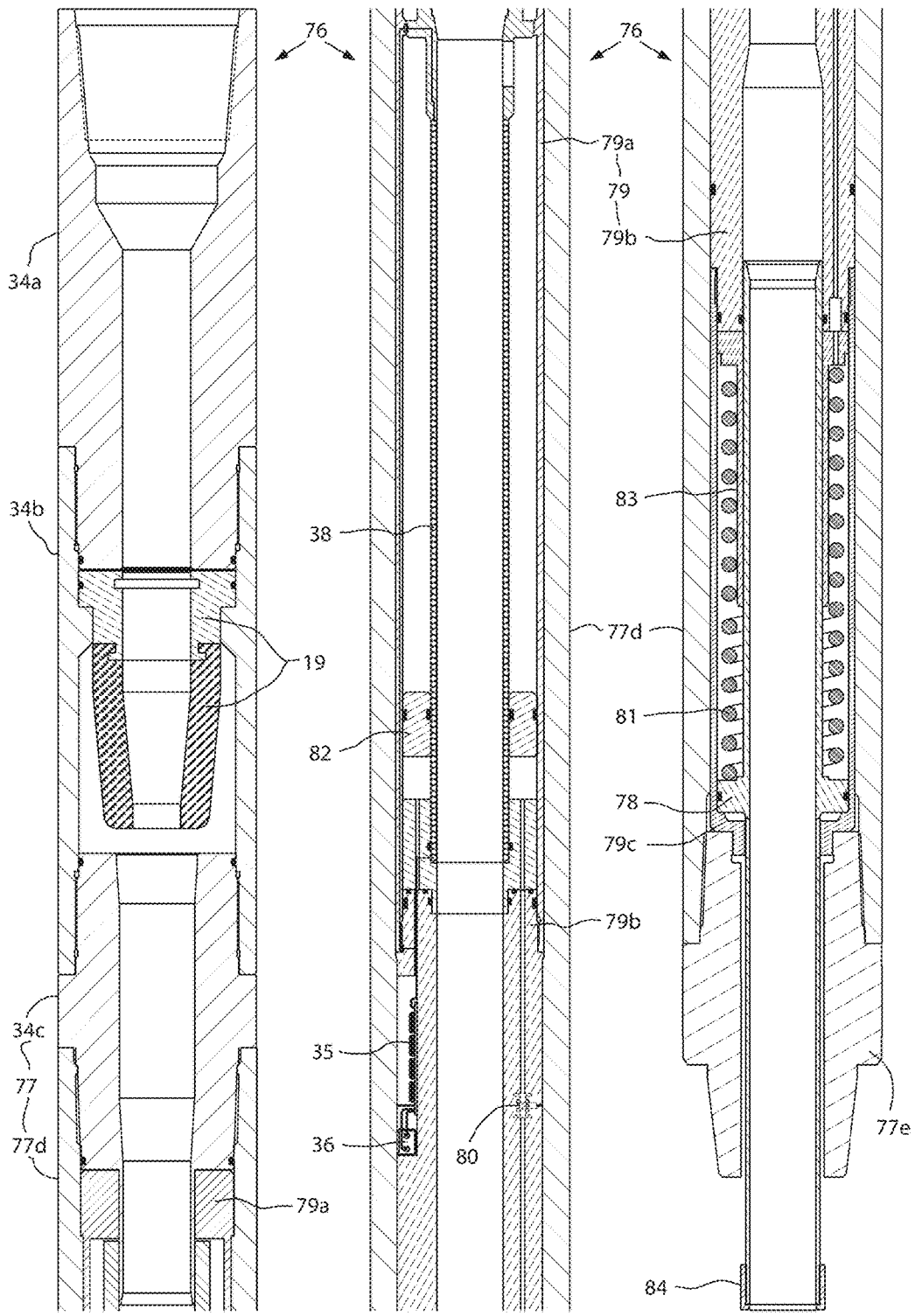
FIGS. 10A-10C illustrate a first alternative control sub, according to another embodiment of the present disclosure.
Figure 11:
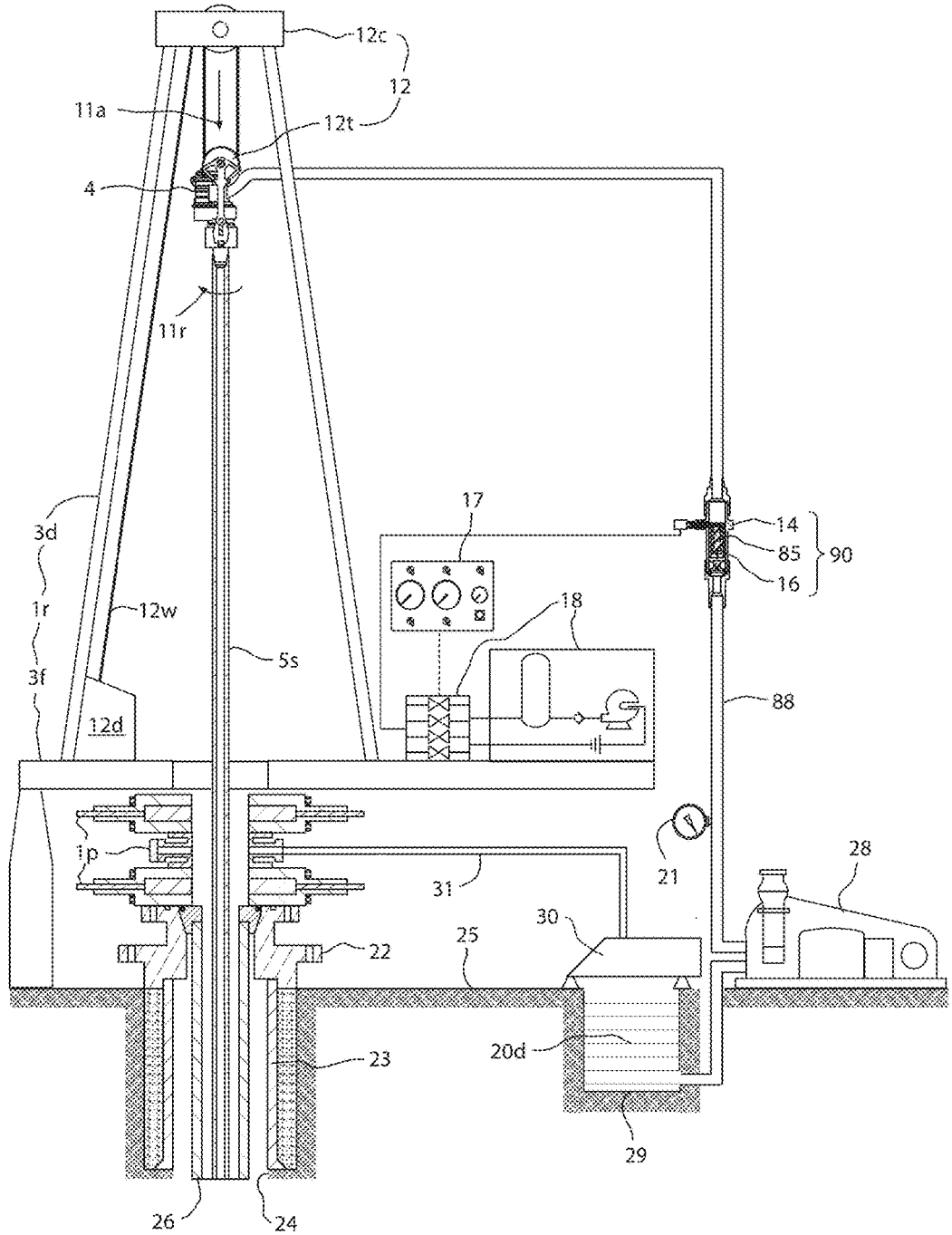
FIGS. 11 and 12A-12D illustrate a second alternative tag delivery system and operation thereof, according to another embodiment of the present disclosure.

FIGS. 10A-10C illustrate a first alternative control sub 76, according to another embodiment of the present disclosure. The first alternative control sub 76 may include the stop 19, a housing 77, the electronics package 35, the battery 36, the antenna 38 (shown schematically), a piston 78, a mandrel 79, an actuator, such as control valve 80, and a return spring 81. The housing 77 may include two or more tubular sections 34a-c, 77d, 77e connected to each other, such as by threaded couplings. The housing 77 may have couplings, such as threaded couplings, formed at each longitudinal end thereof for connection to the tubular string 5s at an upper end thereof and an underreamer (not shown) at a lower end thereof. The housing 77 may have a pocket formed between a fourth section 77d and the lower section 77e for receiving the antenna 38 and the mandrel 79. The mandrel 79 may also include two or more tubular sections 79a-c connected to each other, such as by threaded couplings.

A balance piston 82 may be disposed in a reservoir chamber formed between the upper mandrel section 79a and the outer antenna sleeve, and may divide the chamber into an upper portion and a lower portion. One or more ports of the upper antenna sleeve may provide fluid communication between the reservoir chamber upper portion and a bore of the first alternative control sub 76. Hydraulic fluid, such as oil (not shown), may be disposed in the reservoir chamber lower portion. The balance piston 82 may carry inner and outer seals for isolating the hydraulic oil from the bore of the first alternative control sub 76. Each of the antenna nut and the antenna plug may have a hydraulic passage formed therethrough.

The mandrel 79 may have one or more recesses formed in an outer surface thereof. The mandrel 79 may be connected to the fourth housing section 77d, such as by threaded couplings. The mandrel 79 may have electrical conduits formed in a wall thereof for receiving lead wires connecting an electrical socket (not shown) to the electronics package 35, and connecting the battery 36 to the electronics package 35. The mandrel 79 may also have a hydraulic passage formed therethrough for providing fluid communication between the reservoir and the piston 78, and the control valve 80 may be disposed in the passage for selectively opening and closing the passage. One or more seals may be disposed in an interface between the fourth housing section 77d and the mandrel 79. The mandrel 79 may have another electrical conduit formed in the wall thereof for receiving lead wires connecting the electronics package 35 to the control valve 80.

The control valve 80 may be a solenoid operated shutoff or check valve. If the control valve 80 is a check valve, the solenoid may operate the valve between a check position and an open position. In the check position, the valve may be oriented to prevent flow from the piston 78 to the balance piston 82 and allow reverse flow therethrough. The electronics package 35 and battery 36 may be disposed in respective recesses of the mandrel 79. The motor controller 35m may instead be used to supply appropriate power to the solenoid of the control valve 80 for operation thereof between the positions.

The piston 78 may have an upper sleeve portion, a lower sleeve portion, and a shoulder portion connecting the sleeve portions. The lower sleeve portion of the piston 78 may extend into the underreamer when the first alternative control sub 76 is connected thereto. A cap 84 may be connected to a bottom of the lower sleeve portion, such as by threaded couplings and/or fasteners. A control chamber may be formed longitudinally between a bottom of the second mandrel section 79b and a shoulder of the third mandrel section 79c. The control chamber may be radially formed between an outer surface of the piston sleeve portions and an inner surface of the third mandrel section 79c. The shoulder of the piston 78 may be disposed in the control chamber and may divide the control chamber into an upper portion and a lower portion.

The upper portion of the control chamber may be filled with hydraulic fluid and be in fluid communication with the reservoir chamber. The lower portion of the control chamber may be in fluid communication with the controller bore via ports formed through a wall of the piston lower sleeve portion. The return spring 81 may be a compression spring disposed in an upper portion of the control chamber between a lower face of a guide sleeve 83 and an upper face of the shoulder of the piston 78, thereby biasing the cap 84 downward into engagement with a piston of the underreamer.

The underreamer may include a body, the piston, one or more seal sleeves, a flow sleeve, and one or more arms. Each arm may be movable between an extended and a retracted position and may initially be disposed in a pocket of the body in the retracted position. Each arm may be pivotally connected to the piston, such as by a fastener. The body may have an extension profile formed in a pocket surface thereof for each arm and a retraction profile formed in a pocket surface thereof for each arm and each arm may have mating extension and retraction profiles formed therein. Upward movement of each arm may disengage the respective retraction profiles and engage the respective extension profiles, thereby forcing the arms radially outward from the retracted position to the extended position. The underreamer may be fluid operated by drilling fluid injected through the tubular string being at a high pressure and returns flowing up the annulus being at a lower pressure. The high pressure may act on a lower face of the underreamer piston and the low pressure may act on an upper face of the piston, thereby creating a net upward actuation force and moving the arms from the retracted position to the extended position.

The first alternative control sub 76 may selectively lock and unlock the underreamer in the retracted position. In the locked position, even though force is exerted on the underreamer piston by the drilling fluid, the closed control valve 80 may prevent the underreamer piston from extending the arms due to incompressibility of the hydraulic fluid in the control chamber upper portion. The dart 15 may be pumped to the seat 19s when it is desired to unlock the underreamer. The MCU of the control circuit may open the control valve 80 in response to receipt of the command signal, thereby allowing the underreamer piston to extend the underreamer arms.

FIGS. 11 and 12A-12D illustrate a second alternative tag delivery system 90 and operation thereof, according to another embodiment of the present disclosure. The second alternative tag delivery system 90 may include the tag carrier launcher 14, a tag carrier, the RFID tag 16, the control console 17, the HPU 18, and a seat 87. The tag carrier may be a pump down plug, such as a dart 85. The tag carrier launcher 14 may be assembled as part of alternative supply line 88 connecting the outlet of the mud pump 28 and the inlet of the top drive 4. In some operations it may be desired to pump fluid (such as drilling fluid 20d, cement slurry 72, and/or chaser fluid 97h) through the tubular string with minimal interruption, referred to herein as continuous pumping. For example, this may be desired when performing cementing operations. A launcher actuator that can launch tag carriers without pumping interruption may be advantageous to continuous pumping operations. As before, the control console 17 may be located on or near the floor 3f, at another location on the drilling rig 1r, or the control console 17 may be located remotely from the drilling rig 1r.

As before, the tag carrier launcher 14 may include a body, a deflector, a canister, a gate, an adapter, and the actuator. The dart 85 may be disposed in the canister bore. The dart 85 may include a finned portion 85f, a mandrel portion 85m, and a catch element, such as a tail portion 85t. The finned portion 85f may include one or more (three shown) fins extending outward from an outer surface of the mandrel portion 85m. The dart 85 may include a material having sufficient flexibility to be pumped through the top drive 4. The flexible material may be a foamed polymer, such as polyurethane. A diameter of the tail portion 85t may be greater than a diameter of the mandrel portion 85m and less than an outer diameter of the finned portion 85f. A receptacle may be formed in the tail portion 85t of the dart 85, and the RFID tag 16 may be disposed in the receptacle. The receptacle may be centrally located within the dart 85. The RFID tag 16 may be retained in the receptacle, for example by bonding or interference fit.

The outer diameter of the finned portion 85f may correspond to, such as equal to, greater than, or substantially greater than, an inner diameter of the tubular string 5s. The finned portion 85f may engage the tubular string 5s as the dart 85 is pumped through the bore thereof for sealing engagement therewith, for centering the dart therein, and for maintaining orientation of the RFID tag 16 relative to the tubular string 5s. The orientation may be a parallel relationship between a longitudinal axis of the RFID tag 16 and a longitudinal axis of the tubular string 5s. The longitudinal axis of the RFID tag 16 may vary by +/−45 degrees from parallel with the longitudinal axis of the tubular string 5s to provide for more reliable transmission of command signals.

The seat 87 may be part of a modified control sub 86. The modified control sub may be similar to the control sub 6 except for having upper housing section 89 instead of the housing sections 34a-d, and having the seat 87 instead of the stop 19. The seat 87 may be similar to the antenna plug 38p. The seat 87 may include a conical upper nozzle portion 87n, a conical lower diffuser portion 87d, and a throat portion 87t connecting the nozzle and diffuser portions. The seat 87 may include a relatively stiff and nonconductive material, such as an engineering polymer or fiber reinforced composite.

Figures 12A, 12B, 12C, 12D:
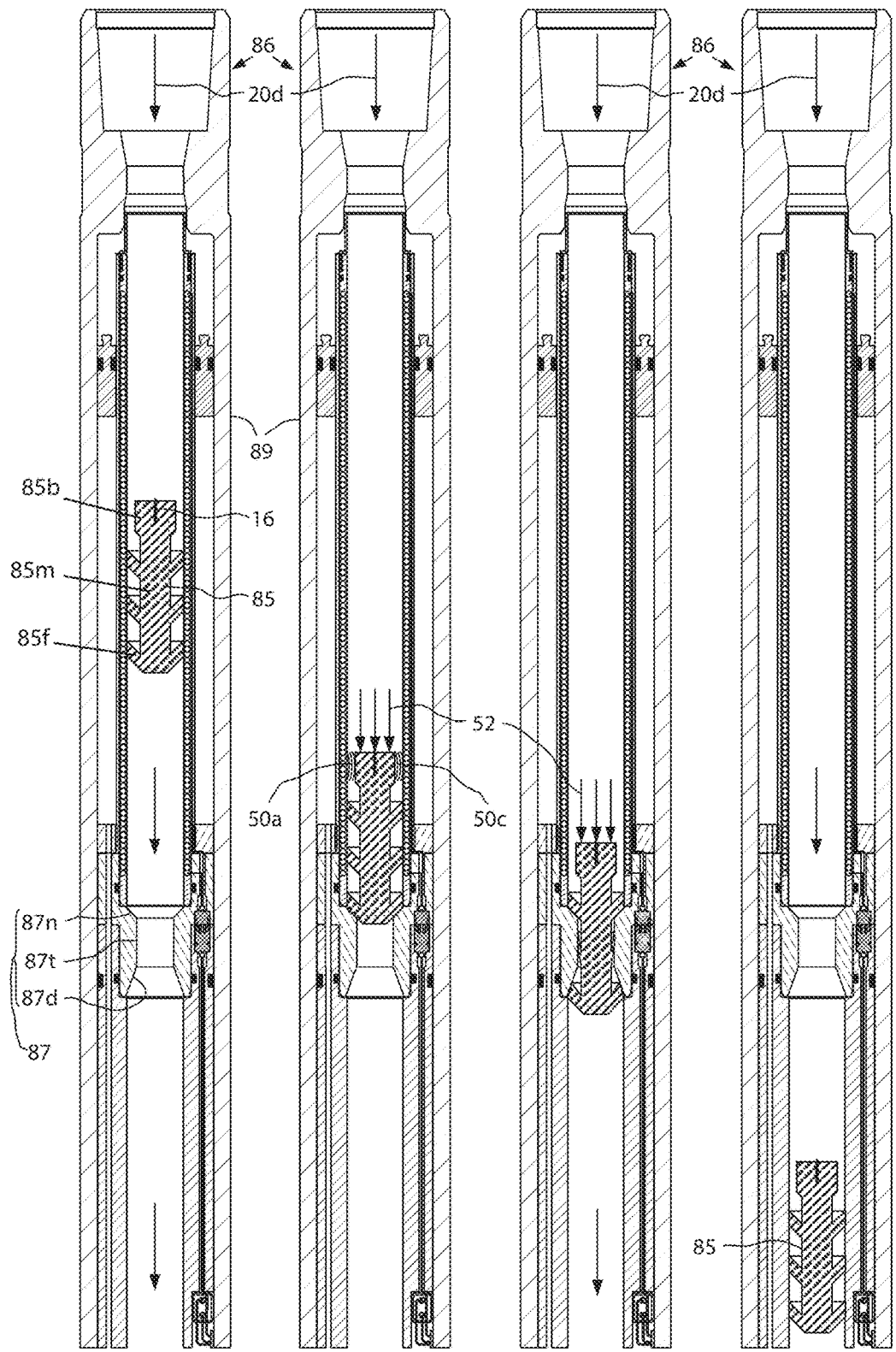

Referring specifically to FIG. 12A, in preparation of the downhole operation, a technician may operate the tag carrier launcher 14 via the control console 17. This may provide an additional safety mechanism in embodiments wherein the control console 17 is located remotely from the drilling rig 1r. The dart 85 may be released and propelled into the tubular string 5s by fluid pumped by the mud pump 28. Referring specifically to FIG. 12B, the dart 85 may travel down the tubular string 5s and into the control sub 6 until a leading fin thereof is caught by the nozzle portion 87n. The RFID tag thereby may be aligned with the antenna when the leading fin of the dart is caught by the nozzle portion. The RFID tag 16 may receive the activation signal 50a from the antenna of the modified control sub 86 and reply by transmitting the command signal 50c thereto. The MCU of the control circuit may operate the actuator 40 to shift the valve sleeve 47 upward to the open position. Continued pumping of the fluid against the stopped dart 85 may increase pressure 52 in the bore of the tubular string 5s. The increase in pressure 52 may be detected at the surface by monitoring the pressure gauge 21.

Referring specifically to FIG. 12C, the pressure 52 exerted on the dart 85 may increase until a threshold pressure is achieved, thereby passing the dart through the throat 87t by compression of the finned portion 85f of the dart, thereby allowing passage of the dart through the throat. Referring specifically to FIG. 12D, once the dart 85 has passed through the seat 87, the pressure 52 may decrease and the dart may resume downward travel through the modified control sub 86 and the circulation sub 7.

Alternatively, the second alternative tag delivery system 90 may be used with the first alternative control sub 76 instead of the tag delivery system 2.

Figure 13A:
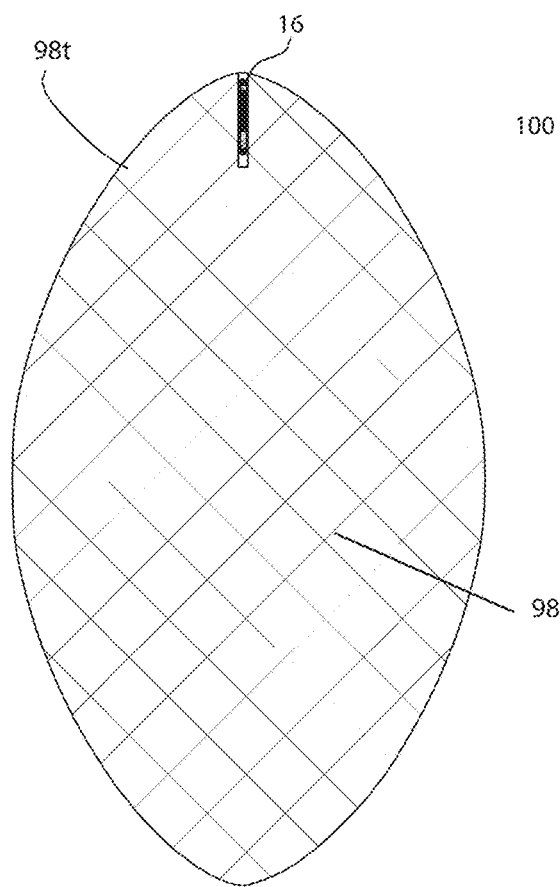
FIG. 13A illustrates an alternative tag carrier for use with the second alternative tag delivery system, according to another embodiment of the present disclosure.

FIG. 13A illustrates an alternative tag carrier for use with the second alternative tag delivery system, according to another embodiment of the present disclosure. Instead of the tag carrier being the dart 85, the tag carrier may be another type of pump down plug, such as a pig 98. The pig 98 may be disposed in the canister bore of the tag carrier launcher 14. The pig 98 may include a body having an elongated shape, such as a shape resembling an (American) football. The pig body may include a material having sufficient flexibility to be pumped through the top drive 4. The flexible material may be a foamed polymer, such as polyurethane. A receptacle may be formed in a tail portion 98t of the pig body and the RFID tag 16 may be disposed in the receptacle. The receptacle may be centrally located within the pig 98. The RFID tag 16 may be retained in the receptacle by bonding or interference fit.

Alternatively, the pig body may be ellipsoid (i.e., a prolate), egg, capsule, or bullet shaped.

A maximum outer diameter of the pig body may correspond to, such as equal to, slightly greater than, or slightly less than, an inner diameter of the tubular string 5s. The pig body may engage the tubular string 5s as the pig 98 is pumped through the bore thereof for centering the pig therein and for maintaining orientation of the RFID tag 16 relative to the tubular string 5s. The orientation may be a parallel relationship between a longitudinal axis of the RFID tag 16 and a longitudinal axis of the tubular string 5s. The longitudinal axis of the RFID tag 16 may vary by +/−45 degrees from parallel with the longitudinal axis of the tubular string 5s to provide for more reliable transmission of command signals. The pig body may or may not sealingly engage the bore of the tubular string 5s as the pig 98 is pumped therethrough. Due to the curved outer surface of the pig 98, the pig may not be completely stopped upon engagement with the seat 87; however, the pig may be sufficiently slowed to ensure communication between the RFID tag 16 and the antenna 38.

Figure 13B:
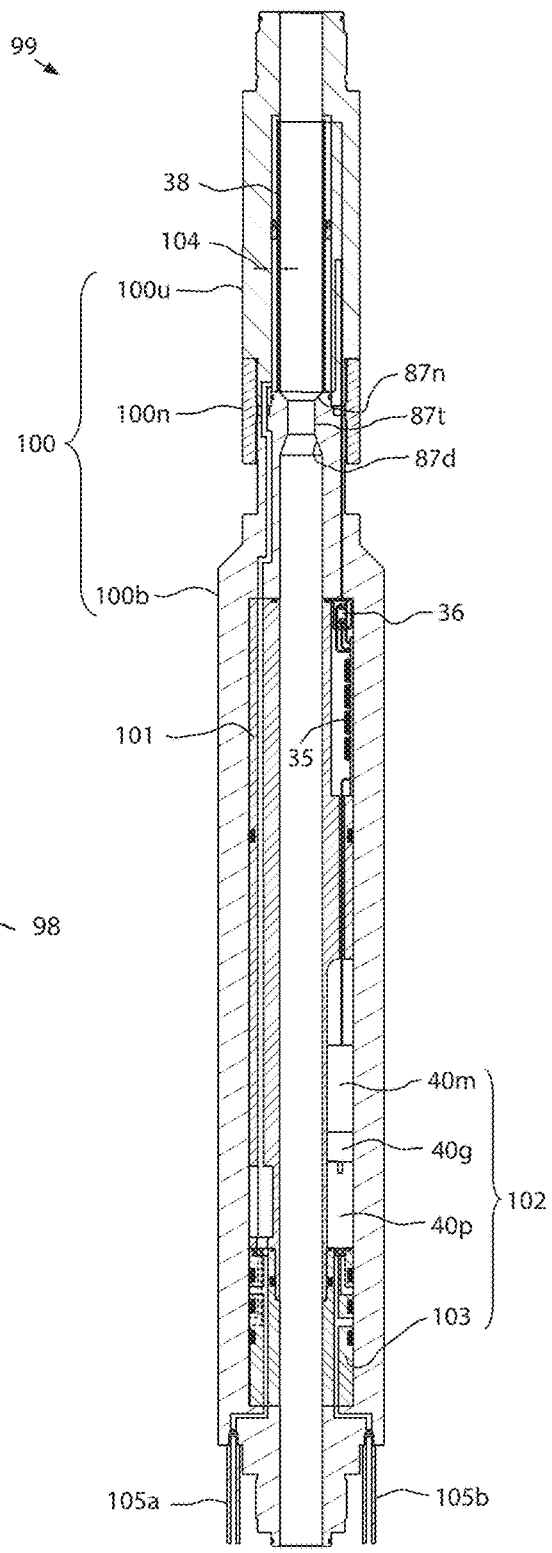

FIGS. 13B and 14A illustrate a second alternative control sub 99, according to another embodiment of the present disclosure. The second alternative control sub 99 may include the seat 87, a housing 100, the electronics package 35, the battery 36, the antenna 38, a mandrel 101, and an actuator 102. The housing 100 may include an upper antenna section 100u and a lower actuator section 100b connected together longitudinally, such as by a threaded nut 100n and threaded couplings, and torsionally, such as by castellations or crenellations. The second alternative control sub 99 may further include an adapter (not shown) having couplings, such as threaded couplings, formed at longitudinal ends thereof for connection to the tubular string 5s at an upper end thereof and the antenna housing section 92u at a lower end thereof.

The antenna housing section 100u may have a pocket formed in an inner surface thereof for receiving the antenna 38 and forming a reservoir chamber 104 therebetween, similar to that of the control sub 6. The actuator housing section 100b may have the seat 87 formed in an inner surface thereof and at a top thereof so that the seat is adjacent to the antenna 38. The actuator housing section 100b may have a pocket formed in an inner surface thereof for receiving the mandrel 101 and the manifold 103. The mandrel 101 may be similar to the control sub mandrel 39 and have recesses for receiving the electronics package 35 and the battery 36. Lead wires may extend between the antenna housing section 100u and the actuator housing section 100b for connection of the electronics package 35 and the antenna 38. A hydraulic conduit may extend between the antenna housing section 100u and the actuator housing section 100b for fluid communication between the actuator 102 and the hydraulic reservoir 104.

The second alternative control sub 99 may be used to operate a second modified circulation sub 106 (FIG. 14A). An upper end of the second modified circulation sub 106 may be connected to the actuator housing section 100b, such as by another threaded nut (not shown) and threaded couplings, and torsionally, such as by castellations or crenellations. The second alternative control sub 99 may be in fluid communication with the second modified circulation sub 106, such as by one or more (pair shown) first hydraulic conduits 105a,b. The second modified circulation sub 106 may be similar to the circulation sub 7 or first alternative circulation sub 57 except for having hydraulic ports for receiving the external hydraulic conduits 105a,b instead of internal hydraulic passages.

The actuator 102 may include the electric motor 40m, the gearbox 40g, the pump 40p, a manifold 103, and one or more pressure sensors (not shown). The manifold 103 may include an electric motor 103m, a gearbox 103g, a motion converter, such as a lead screw 103s, and a spool valve 103v. The electric motor 103m may include a stator in electrical communication with the motor controller and a rotor in electromagnetic communication with the stator for being torsionally driven thereby. The gearbox 103g may have an input shaft torsionally connected to the rotor. The lead screw 103s may have an input shaft torsionally connected to an output shaft of the gearbox 103g. The spool valve 103v may include a shaft connected to an output shaft of the lead screw 103s for being longitudinally driven thereby between a first position (FIG. 14A) and a second position (FIG. 14B).

The spool valve 103v may further include a valve member connected to the shaft and a housing. The spool valve housing may have a port in fluid communication with the hydraulic reservoir chamber 104 via the mandrel hydraulic passage and another port in fluid communication with an outlet of the pump 40p. The spool valve housing may further have a pair of ports in fluid communication with the first hydraulic conduit 105a and another pair of ports in fluid communication with the second hydraulic conduit 105b. The valve member may have a pair of passages for selectively providing fluid communication between the reservoir chamber 104 and the hydraulic conduit 105b and between the pump 40p and the hydraulic conduit 105a (FIG. 14A), and another pair of passages for selectively providing fluid communication between the reservoir chamber 104 and the hydraulic conduit 105a and between the pump 40p and the hydraulic conduit 105a (FIG. 14B).

In the position shown in FIG. 14A, the spool valve 103v may provide fluid communication between the outlet of the pump 40p and the first hydraulic conduit 105a while providing fluid communication between the reservoir chamber 104 and the second hydraulic conduit 105b. In the second position, the spool valve 103v may provide fluid communication between the outlet of the pump 40p and the second hydraulic conduit 105b while providing fluid communication between the reservoir chamber 104 and first the hydraulic conduit 105a.

A pressure sensor may be in fluid communication with the reservoir chamber and another pressure sensor may be in fluid communication with an outlet of the pump 40p and each pressure sensor may be in electrical communication with the MCU to indicate when the piston 37 has reached the respective upper and lower positions by detecting a corresponding pressure increase at the outlet of the pump.

Alternatively, the manifold 103 may be used with the control sub 6 and/or the modified control sub 86 instead of the control valves 44u,b.

FIG. 14B illustrates another second alternative control sub 107 for operating a crossover tool 108, according to another embodiment of the present disclosure. The second alternative control sub 107 and crossover tool 108 may be used in a reverse liner cementing operation. During deployment of the liner string, the crossover tool 108 may be in a forward bore position. Once the liner string has been deployed to the desired depth, a first dart 85 may be launched followed by cement slurry and a second dart 85. A quantity of chaser fluid may be pumped followed by a third dart 85. The drilling fluid 20d may then be pumped to propel the train down the tubular string 5s. The MCU of the control sub 107 may receive the command signal from the first dart 85 and shift the crossover tool 108 to a bypass position. Once the cement slurry has been pumped into the lower formation 27b, the MCU of the control sub 107 may receive the command signal from the second dart 85 and shift the crossover tool back to the forward bore position. The MCU of the control sub 107 may ignore the third dart 85 as it may be addressed to a control sub (not shown) of a liner isolation valve (not shown) for facilitating expansion of an expandable liner hanger (not shown). The liner isolation valve may include a downwardly closing flapper valve and a control sub having the seat 87 and operable to prop the flapper valve open and release the flapper valve in response to receiving a command signal from the third dart 85.

Alternatively, the liner isolation valve may be a modification of the alternative circulation sub 57 by omitting the circulation ports 48. Alternatively, the tag delivery system 2 may be used with the second alternative control subs 99, 107 and/or control sub of the liner isolation valve instead of the alternative tag delivery system 90.

FIG. 15A illustrates a liner deployment assembly 109 having a third alternative control sub 110, according to another embodiment of the present disclosure. FIG. 15B illustrates operation of the liner deployment assembly 109. The liner deployment assembly 109 may include a setting tool, such as expander 109e, the third alternative control sub 110, a latch 109h, and a stinger 109s. The members 109e,h,s and 110 may be connected to each other, such as by threaded couplings. The liner deployment assembly 109 may be assembled with the tubular string 5s to form a tubular string 5s, 109.

The liner deployment assembly 109 may be used to deploy a tubular string 111 into the wellbore 24 until the tubular string 111 is adjacent to the lower formation 27b. The tubular string 111 may include a liner hanger 111h, a float collar 111c, joints of liner 111j, and a shoe (not shown). The liner string members 111c,h,j may each be connected together, such as by threaded couplings.

The liner hanger 111h may be an expandable liner hanger and the expander 109e may be operable to radially and plastically expand the liner hanger 111h into engagement with the inner casing string 26. The expander 109e may include an adapter, a mandrel, a piston assembly, and a cone. The piston assembly may include a piston, upper and lower sleeves, a cap, an inlet, and an outlet. The cone may include a body, one or more segments, a base, one or more retainers, a sleeve, a shoe, a pusher, and one or more shearable fasteners. The cone may be driven through the liner hanger 111h by the piston. The liner hanger 111h may include a tubular body made from a ductile material capable of sustaining plastic deformation, such as a metal or alloy. The liner hanger 111h may include one or more seals disposed around an outer surface of the body. The liner hanger 111h may also have a hard material or teeth embedded/formed in one or more of the seals and/or an outer surface of the hanger body for engaging an inner surface of the inner casing string 26 and/or supporting the seals.

Alternatively, the liner hanger may include an anchor and a packoff. The anchor may be operable to engage the casing and longitudinally support the liner string from the casing. The anchor may include slips and a cone. The anchor may accommodate rotation of the liner string relative to the casing, such as by including a bearing. The packoff may be operable to radially expand into engagement with an inner surface of the casing, thereby isolating the liner-casing interface. The setting tool may be operable to set the anchor and packoff independently. The setting tool may be operable to drive the slips onto the cone and compress the packoff. The anchor may be set before cementing and the packoff may be set after cementing.

The float collar 111c may include a tubular housing and a check valve. The housing may be tubular, have a bore formed therethrough, and have a profile for receiving the latch 109h. The check valve may be disposed in the housing bore and connected to the housing by bonding with a drillable material, such as cement. The check valve may include a drillable material, such as metal or alloy or polymer. The check valve may include a body and a valve member, such as a flapper, pivotally connected to the body and biased toward a closed position, such as by a torsion spring. The flapper may be oriented to allow fluid flow from the liner hanger 111h into the liner bore and prevent reverse flow from the liner bore into the liner hanger. The flapper may be propped open by the stinger 109s. Once the stinger 109s is removed, the flapper may close to prevent flow of cement slurry from the annulus into the liner bore.

The latch 109h may longitudinally and torsionally connect the tubular string 111 to the liner deployment assembly 109. The latch 109h may include a piston, a stop, a release, a longitudinal fastener, such as a collet, a cap, a case, a spring, one or more sets of one or more shearable fasteners, an override, a body, a catch, and one or more torsional fasteners. The latch piston may be fluidly operable to release fingers of the collet when actuated by a threshold release pressure. Once the liner hanger 111h has been expanded into engagement with the inner casing string 26 and weight of the liner string 111 is supported by the liner hanger 111h, fluid pressure may be increased. The fluid pressure may push the latch piston and fracture the second set of shearable fasteners, thereby releasing the latch piston. The latch piston may then move upward toward the collet until the piston abuts a bottom of the collet. The latch piston may continue upward movement while carrying the collet, case, and cap upward until a bottom of the release abuts the fingers, thereby pushing the fingers radially inward. During upward movement of the latch piston, the catch may align and enter the recess, thereby forming a downward stop preventing reengagement of the fingers. Movement of the latch piston may continue until the cap abuts the stop, thereby ensuring complete disengagement of the fingers.

Figures 16A, 16B, 16C:
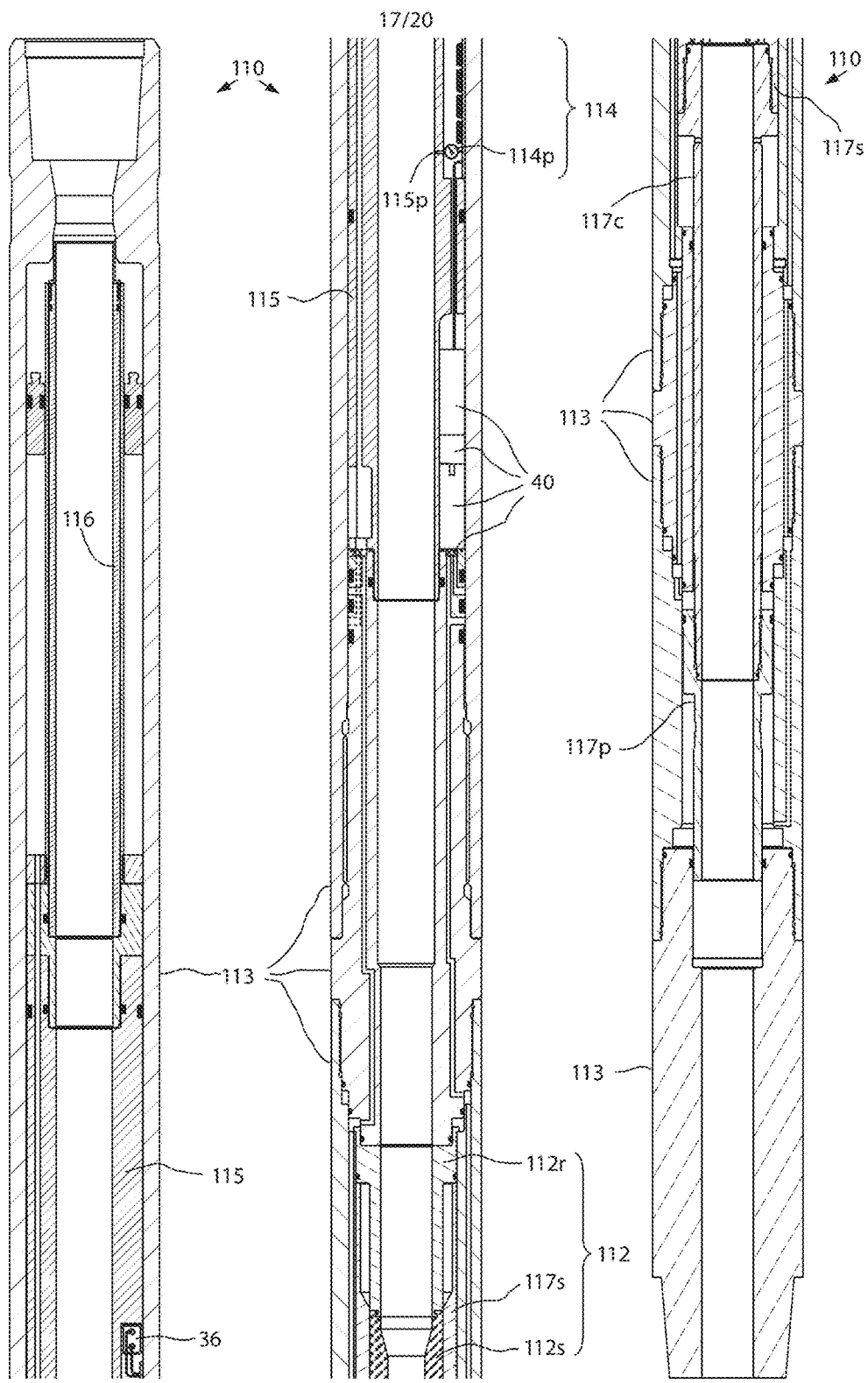
FIGS. 16A-16C illustrate the third alternative control sub.

FIGS. 16A-16C illustrate the third alternative control sub 110. The third alternative control sub 110 may include a stop 112, a housing 113, an electronics package 114, the battery 36, a mandrel 115, and the actuator 40. The housing 113 may include two or more tubular sections connected to each other, such as by threaded couplings. The housing 113 may have couplings, such as threaded couplings, formed at each longitudinal end thereof for connection to the latch 109h at an upper end thereof and the stinger 109s at a lower end thereof. The housing 113 may have a pocket formed therein receiving a sleeve 116 and the mandrel 115. The sleeve 116 may replace the antenna 38 and the reservoir chamber may be formed between the housing 113 and the sleeve. The electronics package 114 may be similar to the electronics package 35 except for the addition of a pressure sensor 114p thereto. The mandrel 115 may be similar to the mandrel 39 except for addition of a port 115p formed through a wall thereof for placing the pressure sensor 114p in fluid communication with a bore of the third alternative control sub 110.

Figures 17A, 17B, 17C, 17D:
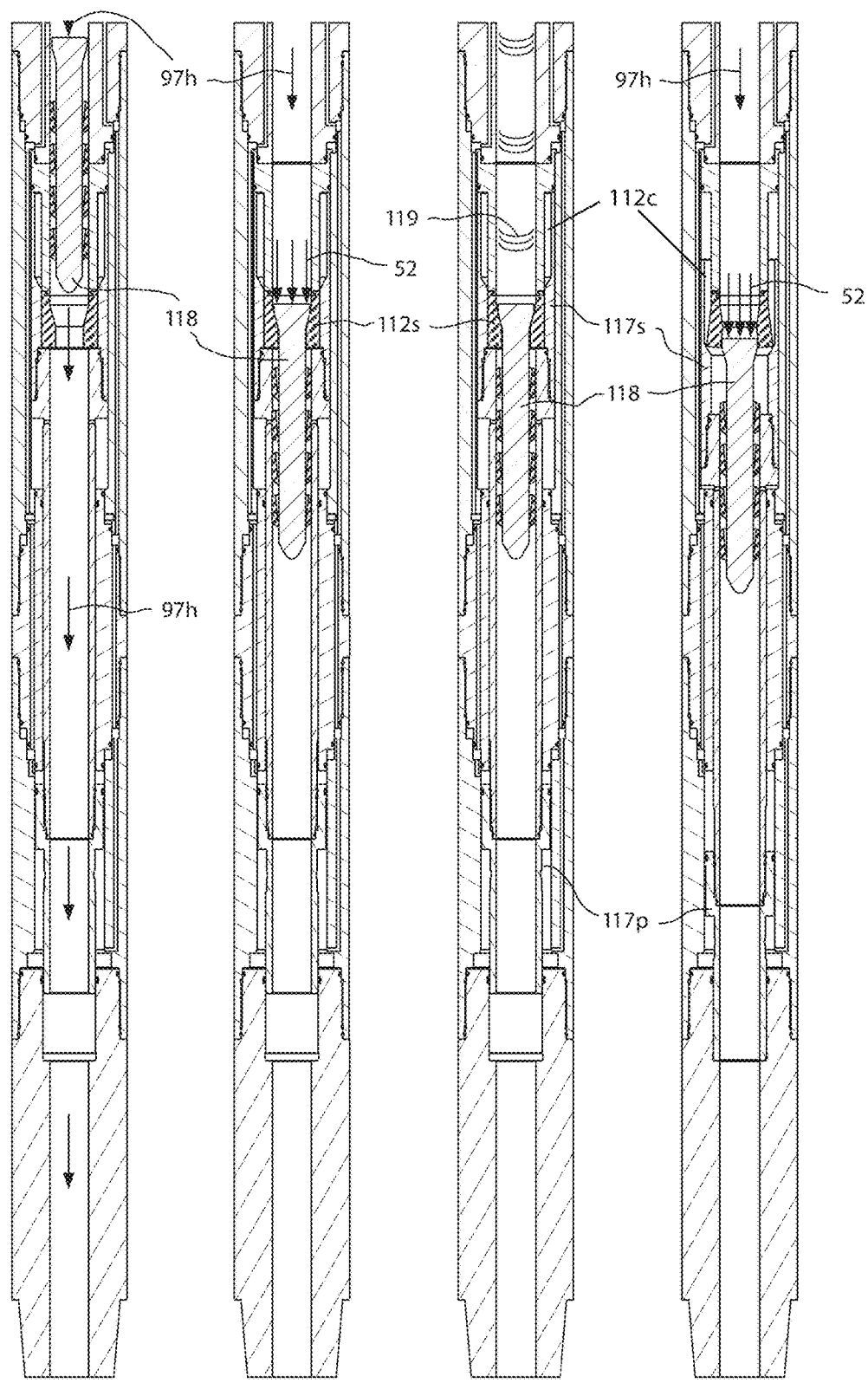
FIGS. 17A-17D illustrate operation of the third alternative control sub.

The stop 112 may include a seat 112s, a retainer 112r, a seat sleeve 117s, a connector sleeve 117c, and a piston 117p. The retainer 112r may include a metal or alloy, and the seat 112s may include a flexible material, such as an elastomer or elastomeric copolymer. The retainer 112r may be connected to the housing 113 by entrapment of an upper portion thereof between adjacent sections of the housing. The seat 112s may be fitted or molded to a lower portion of the retainer 112r. The seat 112s may have cylindrical upper and lower portions and a conical mid portion extending between the upper and lower portions. The upper portion of the seat 112s may have a larger inner diameter than the lower portion thereof and the conical portion may converge from the upper portion to the lower portion to accommodate the difference in diameters between the upper and lower portions. The seat 112s may be operable to catch a dart 118 (FIG. 17A).

The dart 118 may include a finned seal and a mandrel. The dart mandrel may include a relatively stiff and drillable material, such as an engineering polymer, fiber reinforced composite, or non-ferrous metal or alloy. The finned seal may include one or more (four shown in FIG. 17A) fins disposed along an outer surface of the mandrel. Each fin may include an elastomer or elastomeric copolymer and be molded or fitted to a gland (not shown) such that the fins may be stacked along the mandrel. The fin glands may also include an engineering polymer or fiber reinforced composite. The mandrel of the dart 118 may have a stacking shoulder (not shown) formed in an outer surface thereof for retaining the fin glands. The mandrel may also have an enlarged tail for being caught by the seat 112s. A diameter of the tail may be greater than a diameter of the mandrel and less than an outer diameter of the fins. The outer diameter of the fins may correspond to, such as being equal to, greater than, or substantially greater than, an inner diameter of the tubular string 5s, 109. The finned seal may engage the tubular string 5s, 109 as the dart 118 is pumped through the bore thereof for sealing engagement therewith.

The inner diameter of the seat upper portion may be greater than the diameter of the dart tail and the inner diameter of the seat lower portion may be less than the diameter of the dart tail such that the dart tail is caught in the seat conical portion (FIG. 17B) as the dart 118 is pumped through the third alternative control sub 110.

A lower end of the seat sleeve 117s may be connected to an upper end of the connector sleeve 117c, such as by threaded couplings. A lower end of the connector sleeve 117c may be connected to an upper end of the piston 117p, such as by threaded couplings. The piston 117p may be disposed in an actuation chamber formed by adjacent sections of the housing 113 and the piston and sleeves 117c,s may be longitudinally movable relative to the seat 112s between a catch position (FIG. 17A) and a release position (FIG. 17D). The movable unit 117c,p,s may be stopped in the catch position by engagement of the seat sleeve 117s with a shoulder formed in an outer surface of the retainer 117r. The movable unit 117c,p,s may be stopped in the release position by engagement of a bottom of the piston with a shoulder formed in an inner surface of the housing 113.

The seat sleeve 117s may include a stiff material, such as a metal or alloy, and may have a thin walled upper portion and a thick walled lower portion. The thick walled portion of the seat sleeve seat sleeve 117s may have an inner diameter fit to an outer diameter of the seat 112s and the thick walled portion may be aligned with the seat in the catch position, thereby locking the seat in an unexpanded position. The thin walled portion of the seat sleeve 117s may have an inner diameter greater than the outer diameter of the seat 112s to form a seat chamber 112c therebetween and the thin walled portion may be aligned with the seat in the release position, thereby accommodating expansion (FIG. 17D) of the seat 112s during passage of the dart 118 therethrough.

The housing sections adjacent to the piston 117p may carry seals in inner surfaces thereof engaged with the connector sleeve 117c and a lower sleeve portion of the piston to isolate the actuation chamber from the bore of the third alternative control sub 110. A shoulder formed in an outer surface of the piston 117p may be disposed in the actuation chamber and carry a seal in engagement with an inner surface of the housing 113. The piston shoulder may divide the actuation chamber into a catch portion and a release portion. Each end of the actuation chamber may be in fluid communication with a respective control valve 44u,b via a respective hydraulic passage formed in a wall of the housing 113. Each control valve 44u,b may also be in fluid communication with an opposite hydraulic passage via a crossover passage.

The control valves 44u,b may each be electronically actuated, such as by a solenoid, and together may provide selective fluid communication between an outlet of the pump 40p and the catch and release portions of the actuation chamber while providing fluid communication between the reservoir chamber and an alternate one of the catch and release portions of the actuation chamber. Each control valve actuator may be in electrical communication with the MCU of the electronics package 114 for control thereby. A pressure sensor may be in fluid communication with the reservoir chamber and another pressure sensor may be in fluid communication with an outlet of the pump 40p and each pressure sensor may be in electrical communication with the MCU to indicate when the piston 117p has reached the respective upper and lower positions by detecting a corresponding pressure increase at the outlet of the pump 40p.

Alternatively, the third alternative control sub 110 may have the manifold 103 instead of the control valves 44u,b.

FIGS. 17A-17D illustrate operation of the third alternative control sub 110. Referring specifically to FIG. 17A, once the wellbore 24 has been drilled through the lower formation 27b to the desired depth and the drill string 5 retrieved, the tubular string 111 may be assembled and fastened to the liner deployment assembly 109. The tubular string 5s, 109 may be assembled to deploy the tubular string 111 into the lower formation 27b. Once the tubular string 111 has been deployed to the appropriate depth, a quantity of cement slurry (not shown) may be pumped into the tubular string 5s followed by a slug of chaser fluid 97h. Once the cement slurry and chaser fluid 97h have been pumped, a technician may operate the tag carrier launcher 14 via the control console 17 and chaser fluid 97h may be pumped to drive the dart 118 and cement slurry through the tubular string 5s, 109.

Referring specifically to FIG. 17B, the dart 118 may travel down the tubular string 5s and into the third alternative control sub 110 until the cement slurry flows through the tubular string 111 and into an annulus between the tubular string and the lower formation 27b and the tail is caught by the seat 112s. Continued pumping of the chaser fluid 97h against the stopped dart 118 may increase pressure 52 in the bore of the tubular string 5s. The increase in pressure 52 may be detected at the surface 25 by monitoring the pressure gauge 21. Pumping may continue until a first threshold pressure is achieved to operate the expander piston, thereby driving the expander cone through the expandable liner hanger 111*h*. Pumping may continue until a second threshold pressure is achieved to release the latch 109*h* from the float collar 111*c*.

Referring specifically to FIG. 17C, pressure pulses 119 may be transmitted down the tubular string bore to the pressure sensor 114*p* by pumping against the stopped dart 118 and then relieving pressure in the tubular string bore according to a protocol. The MCU may receive the command signal from the pulses 119 and shift the seat sleeve 117*s* to the release position.

Referring specifically to FIG. 17D, the tubular string 5*s*, 109 may be raised from the tubular string 111, thereby removing the stinger 109*s* from obstructing closure of the float collar 111*c*. The float collar 111*c* may then close to prevent backflow of the cement slurry into a bore of the tubular string 111. Pumping of the chaser fluid 97*h* may resume against the stopped dart 118, thereby increasing the pressure 52 and passing the dart tail through the seat 112*s* by expansion thereof, thereby to allow passage of the dart tail through the seat. The dart 118 may be ejected into the wellbore 24.

Alternatively, the stop 112 may be used with the control sub 6, the first alternative control sub 76, the modified control sub 86, and/or the second alternative control sub 99 instead of the respective stops and seats thereof.

FIG. 15C illustrates an accumulator 120 for use with an alternative liner deployment assembly (not shown), according to another embodiment of the present disclosure. The accumulator 120 may include a housing 121, a mandrel 122, a balance piston 123, and a biasing member, such as a compression spring 124. The housing 121 may include two or more tubular sections connected to each other, such as by threaded couplings. The housing 121 may have couplings, such as threaded couplings, formed at each longitudinal end thereof for connection to the latch 109*h* at an upper end thereof and the third alternative control sub 110 at a lower end thereof. The housing 121 may have a pocket formed therein receiving the mandrel 122 and compression spring 124.

An upper end of the mandrel 122 may be connected to the housing 121, such as by threaded couplings. A chamber may be formed between the housing 121 and the mandrel 122. The balance piston 123 may be disposed in the chamber and may divide the chamber into an upper annulus portion and a lower accumulation portion. The compression spring 124 may be disposed in the annulus portion and may have an upper end pressing against a spring washer and a lower end pressing against the balance piston 125, thereby biasing the balance piston toward a lower section of the housing 121.

One or more upper ports 125*u* may be formed through a wall of the housing 121 and may provide fluid communication between the annulus portion and an annulus formed between the accumulator 120 and the tubular string 111. A gap 125*g* may be formed between a bottom of the mandrel 122 and the housing 121, thereby providing fluid communication between the accumulation portion and a bore of the accumulator 120. The housing 121 may also have one or more lower ports 125*d* formed through a wall thereof for equalizing pressure across a joint between adjacent housing sections.

The alternative liner deployment assembly may be similar to the liner deployment assembly 109 except for having a modified expander (not shown). The modified expander may be similar to the expander 109*e* except for the addition of a liner isolation valve, a piston propping open the isolation valve, and a crossover valve. The third alternative control sub 110 may be used to activate the prop piston to release the isolation valve. Once the isolation valve has closed, pressure exerted thereon may move the isolation valve downward to open the crossover valve. The presence of the accumulator 120 may prevent unintentional hydraulic locking from obstructing downward movement of the isolation valve.

Figures 18A, 18B, 18C:
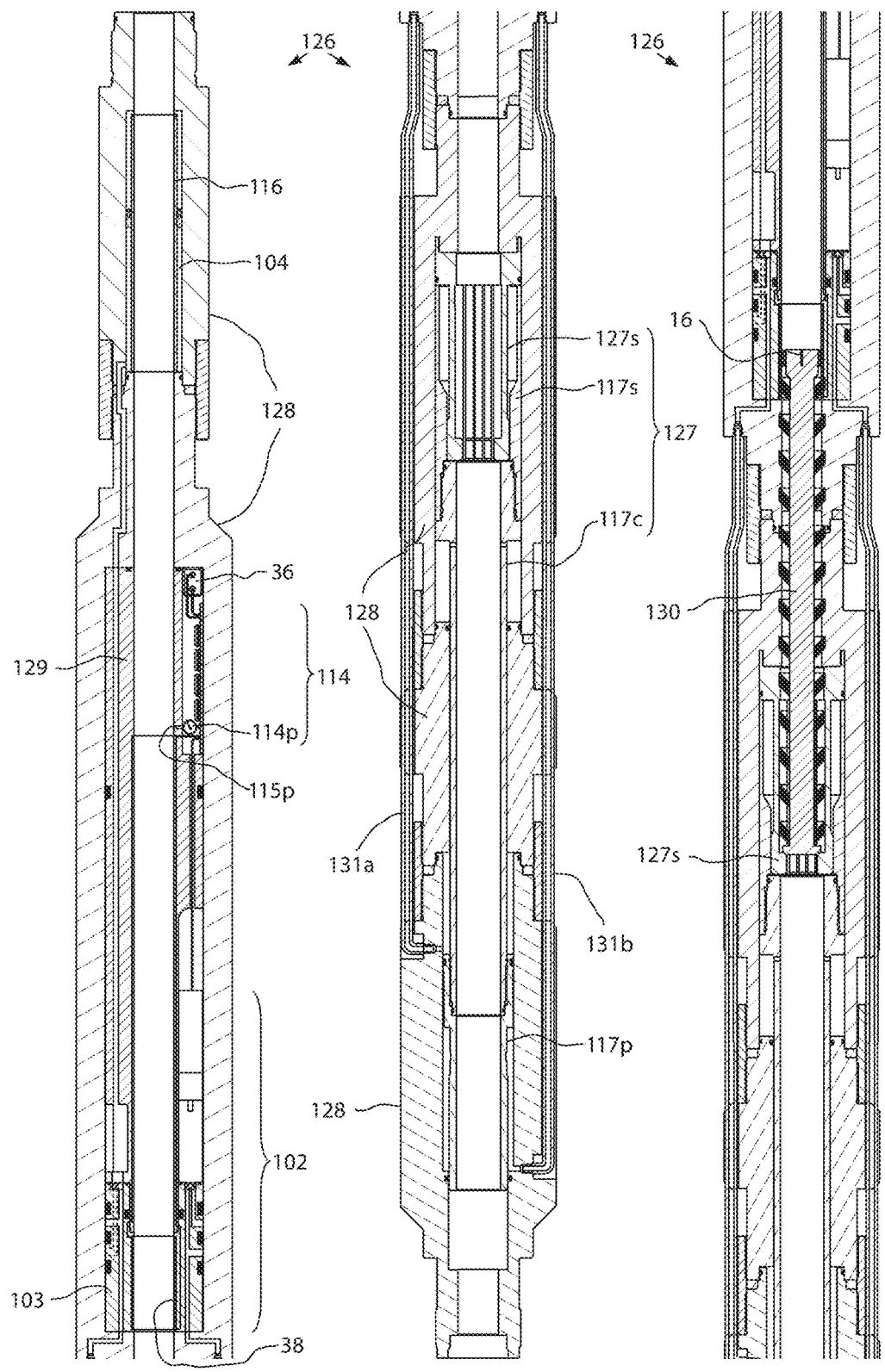
FIGS. 18A and 18B illustrate a fourth alternative control sub, according to another embodiment of the present disclosure.
FIG. 18C illustrates delivery of the RFID tag to the fourth alternative control sub.

FIGS. 18A and 18B illustrate a fourth alternative control sub 126, according to another embodiment of the present disclosure. The fourth alternative control sub 126 may include a stop 127, a housing 128, the electronics package 114, the battery 36, the antenna 38, a mandrel 129, and the actuator 102. The housing 128 may include a plurality of tubular sections connected together longitudinally, such as by a threaded nut and threaded couplings, and torsionally, such as by castellations or crenellations. The fourth alternative control sub 126 may further include an adapter (not shown) having couplings, such as threaded couplings, formed at longitudinal ends thereof for connection to the tubular string 5*s* at an upper end thereof and an upper section of the housing 128 at a lower end thereof.

The fourth alternative control sub 126 may be used to operate the second modified circulation sub 106 and the crossover tool 108. An upper end of the second modified circulation sub 106 may be connected to a lower section of the housing 128, such as by another threaded nut (not shown) and threaded couplings, and torsionally, such as by castellations or crenellations, and an upper end of the crossover tool 108 may be connected to a lower end of the second modified circulation sub 106, such as by another threaded nut (not shown) and threaded couplings, and torsionally, such as by castellations or crenellations. The fourth alternative control sub 126 may be in fluid communication with the second modified circulation sub 106, such as by a first pair of hydraulic conduits (not shown) and may be in fluid communication with the crossover tool 108, such as by a second pair of hydraulic conduits (not shown). The actuator 102 may include manifolds 103 for each of the stop 127, second modified circulation sub 106, and the crossover tool 108 or a single manifold for all three.

The upper housing section may have a pocket formed in an inner surface thereof for receiving the sleeve 116 and forming the reservoir chamber 104 therebetween. An actuator section of the housing 128 may have a pocket formed in an inner surface thereof for receiving the mandrel 129 and the manifold 103. The mandrel 129 may be similar to the mandrel 101 except for addition of the port 115*p* formed through a wall thereof for placing the pressure sensor 114*p* in fluid communication with a bore of the fourth alternative control sub 126. The mandrel 129 may have recesses for receiving the electronics package 114 and the battery 36. A hydraulic conduit may extend between the upper housing section and the actuator housing section for fluid communication between the actuator 102 and the hydraulic reservoir 104. The antenna 38 may be located along an inner surface of a body of the manifold 103 and adjacent to the bore of the fourth alternative control sub 126. Lead wires may extend between the manifold 103 and mandrel 129 for connection of the electronics package 114 and the antenna 38.

The stop 127 may include a segmented seat 127*s*, the seat sleeve 117*s*, the connector sleeve 117*c*, and the piston 117*p*. The segmented seat 127*s* may include a metal or alloy. The segmented seat 127*s* may be a collet having an upper base portion and fingers extending from the base portion to a lower end thereof. The collet base may have a threaded socket formed in an upper end thereof for connection to a threaded shoulder formed in an adjacent section of the housing 128. The segmented seat 127*s* may be longitudinally and/or radially movable between an expanded position (not shown) and a contracted position (shown) by interaction with the seat sleeve 117*s*. Each collet finger may have a lug formed at a lower end thereof. The collet fingers may be cantilevered from the collet base and have a stiffness urging the lugs toward the expanded position. The seat 127*s* may be operable to catch a dart 130 (FIG. 18C).

The dart 130 may include a finned seal and a mandrel. The dart mandrel may include a relatively stiff and nonconductive material, such as an engineering polymer or fiber reinforced composite. The finned seal may include one or more fins disposed along an outer surface of the mandrel. Each fin may include an elastomer or elastomeric copolymer and be molded or fitted to a gland (not shown) such that the fins may be stacked along the mandrel. The fin glands may also include an engineering polymer or fiber reinforced composite. The mandrel of the dart 130 may have a stacking shoulder (not shown) formed in an outer surface thereof for retaining the fin glands. The mandrel may also have an enlarged head for being caught by the seat 127*s*. A diameter of the head may be greater than a diameter of the mandrel and less than an outer diameter of the fins.

A receptacle may be formed in a tail portion of the dart mandrel and the RFID tag 16 may be disposed in the receptacle. The receptacle may be centrally located within the dart 130. The RFID tag 16 may be retained in the receptacle by bonding or interference fit. The outer diameter of the finned seal may correspond to, such as equal to, greater than, or substantially greater than, an inner diameter of the tubular string 5*s*, 109. The finned seal may engage the tubular string 5*s*, 109 as the dart 130 is pumped through the bore thereof for sealing engagement therewith, for centering the dart therein, and for maintaining orientation of the RFID tag 16 relative to the tubular string. The orientation may be a parallel relationship between a longitudinal axis of the RFID tag 16 and a longitudinal axis of the tubular string 5*s*, 109. The longitudinal axis of the RFID tag 16 may vary by +/−45 degrees from parallel with the longitudinal axis of the tubular string 5*s* to provide for more reliable transmission of command signals. A length of the dart 130 may correspond to a distance between the seat 127*s* and the antenna 38 such that the RFID tag 16 is aligned with the antenna 38 when the dart is caught in the seat.

An inner diameter of the base and fingers of the seat 127*s* may be greater than the diameter of the dart head and the (retracted) inner diameter of the seat lugs may be less than the diameter of the dart head such that the dart head is caught by the seat lugs (FIG. 18C) as the dart 130 is pumped through the fourth alternative control sub 126.

The piston 117*p* may be disposed in an actuation chamber formed by adjacent sections of the housing 128 and the piston and sleeves 117*c,s* may be longitudinally movable relative to the seat 127*s* between the catch position and a release position (not shown). The movable unit 117*c,p,s* may be stopped in the catch position by engagement of the seat sleeve 117*s* with a shoulder formed in an outer surface of the seat 127*s*. The movable unit 117*c,p,s* may be stopped in the release position by engagement of a bottom of the piston 117*p* with a shoulder formed in an inner surface of the housing 128.

The thick walled portion of the seat sleeve seat sleeve 117*s* may have an inner diameter fit to an outer diameter of the lugs of the seat 127*s* and the thick walled portion may be aligned with the seat lugs in the catch position, thereby locking the seat in a contracted position. The thin walled portion of the seat sleeve 117*s* may have an inner diameter greater than the (contracted) outer diameter of the seat lugs to form a seat chamber therebetween and the thin walled portion may be aligned with the seat lugs in the release position, thereby accommodating expansion of the seat 127*s* during passage of the dart 130 therethrough.

The housing sections adjacent to the piston 117*p* may carry seals in inner surfaces thereof engaged with the connector sleeve 117*c* and a lower sleeve portion of the piston to isolate the actuation chamber from the bore of the fourth alternative control sub 126. A shoulder formed in an outer surface of the piston 117*p* may be disposed in the actuation chamber and carry a seal in engagement with an inner surface of the housing 128. The piston shoulder may divide the actuation chamber into a catch portion and a release portion. Each end of the actuation chamber may be in fluid communication with the manifold 103 via a respective hydraulic conduit 131*a,b* (third pair).

FIG. 18C illustrates delivery of the RFID tag 16 to the fourth alternative control sub 126. The fourth alternative control sub 126, second modified circulation sub 106, crossover tool 108, and third alternative control sub 110 may be used in a reverse liner reaming and cementing operation. For reverse reaming of the liner string, the second modified circulation sub 106 may be in a first position having the bore valve open and the circulation ports closed and the crossover tool 108 may be in a reverse bore position. After reverse reaming of the liner string, heating fluid may be placed in the annulus between the liner string and the wellbore. Pressure pulses 119 addressed to both the second modified circulation sub 106 and the crossover tool 108 may be sent down the bore of the tubular string 5*s*. The MCU of the fourth alternative control sub 126 may receive the command signal from the pressure pulses 119 and shift the second modified circulation sub 106 to a second position having the bore valve closed and circulation ports open and shift the crossover tool 108 to a forward bore position. Once the second modified circulation sub 106 and the crossover tool 108 have shifted, forward circulation may commence and be maintained while the heating fluid heats the lower formation.

Once the lower formation has been heated, a first dart 130 may be launched followed by cement slurry and a second dart 130. A quantity of chaser fluid may be pumped followed by a third dart 118. The drilling fluid 20*d* may then be pumped to propel the fluid train down the tubular string 5*s*. The MCU of the fourth alternative control sub 126 may receive the command signal from the first dart 130 and shift the second modified circulation sub 106 back to the first position and shift the crossover tool 108 to a bypass position. Once the cement slurry has been pumped into the lower formation 27*b*, the MCU of the fourth alternative control sub 126 may receive the command signal from the second dart 130 and shift the crossover tool 108 back to the forward bore position. The MCU of the fourth alternative control sub 126 may leave the stop 127 in the release position after the second dart 130 such that the third dart 85 passes freely through the seat 127*s* and lands in the third alternative control sub 110 for setting of the liner hanger.

Alternatively, modified versions of the second alternative control subs 99, 107 (and associated darts 85) may be used reverse liner reaming and cementing operation instead of the fourth alternative control sub 126. The modification may be that the electronics package 35 is replaced with the electronics package 114 and the port 115*p* added to the mandrels 101.

Alternatively, the collet seat 127s may be used with the third alternative control sub 110 instead of the flexible seat 112s. Alternatively, a modified collet seat may be used with the control sub 6, the first alternative control sub 76, the modified control sub 86, and/or the second alternative control sub 99 instead of the seats thereof. The modified collet seat may be naturally biased toward the contracted position. Alternatively the seat 127s may include another type of fastener, such as dogs, instead of the fingers and lugs and the dogs may or may not be spring loaded.

Figure 19:
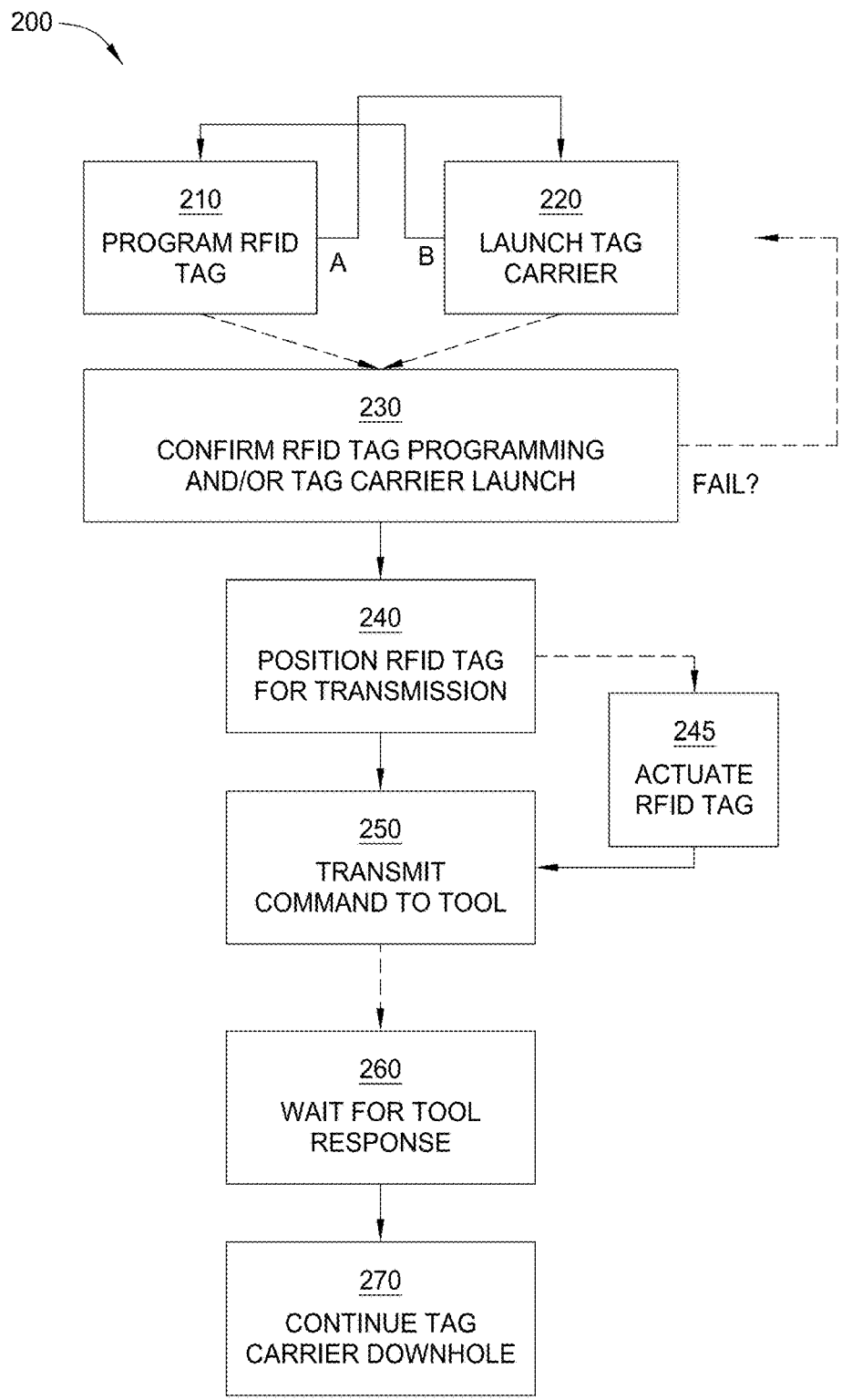
FIG. 19 illustrates a method of using a tag delivery system.

FIG. 19 illustrates a method 200 of using a tag delivery system 2. At step 210, an RFID tag 16 is programmed. RFID tags 16 may be programmed as a final step in the manufacturing process, prior to shipping. RFID tags 16 may be programmed upon receipt at the drilling site, and then stored prior to use. However, since programming includes commands to be delivered to specific tools, and the types of commands may vary by tool and by ad hoc operational demands, prior programming may require precise inventory maintenance so that correctly-programmed RFID tags 16 are utilized at any given time. In some embodiments, an RFID tag 16 may be programmed immediately prior to the loading of a tag carrier into a tag carrier launcher 14. Thus control progresses along path A to step 220, wherein the tag carrier is launched.

Alternatively, in some embodiments, an RFID tag 16 may be programmed subsequently to the loading of a tag carrier in a tag carrier launcher 14. For example, either at the tag carrier launcher 14 or at a portion of the tubular string 5s downhole from the tag carrier launcher 14, a tag reader/programmer may program the RFID tag 16. This may be advantageous to allow bulk loading of tag carriers without regard to precise inventory control. The tag reader/programmer may be controlled from the console 17. Thus, a tag carrier is launched at step 220, with control progressing along path B to step 210, wherein the RFID tag 16 is programmed.

Once the RFID tag 16 is programmed and the tag carrier is launched, an optional step 230 may occur to confirm the RFID 16 tag programming and/or the tag carrier launch. For example, at a portion of the tubular string 5s downhole from the tag carrier launcher 14, a tag reader may detect passage of the tag carrier and confirm programming of the RFID tag 16. In some embodiments, a launcher adapter may include an electronics package and antenna for reading the RFID tag 16 as the tag carrier is pumped therethrough for confirmation of launching of the dart and transmission of a confirmation signal to the control console 17. In the event of failure of the programming or the launch, control may return to repeat steps 210/220. This may be advantageous for continuous pumping operations.

With the tag carrier traveling through the tubular string 5s, at step 240, a RFID tag 16 is positioned in the vicinity of an antenna 38 of a control sub 6 for transmission of a command signal. Positioning may include aligning the orientation of the longitudinal axis of the RFID tag 16 with the antenna 38, slowing the speed of the tag carrier, and/or centralizing or moving the RFID tag 16 radially within the tubular string 5s. Thus, positioning may include catching the tag carrier with a stop.

At step 250, the RFID tag 16 transmits a command signal to the antenna 38 of the control sub 6. Optionally, the RFID tag 16 may be actuated by the control sub 6 at step 245. Actuation may include sending power, an activation signal, or both. The activation signal may include tool identification information. The RFID tag 16 may respond to the actuation by either transmitting a command signal—if the tool is the appropriate tool for that RFID tag 16—or the RFID tag 16 may respond by transmitting a null signal—if the tool is not the appropriate tool for that RFID tag 16. Alternatively, the RFID tag 16 may transmit the same command signal to each tool, and each control sub 6 may determine whether the command signal is appropriate for that tool.

At optional step 260, the tag carrier may remain in the position from step 240 240 (for example, either caught by the stop, or slowed in the tubular string 5s) until the tool provides a response. The response may be indicative that the tool received the command signal and acted appropriately. The response may be indicative that the tool either did not receive the command signal or did not act appropriately. The response may be inferred by an elapsed period of time. An example response may be that the fluid pressure in the tubular string 5s increases by a certain amount or to a certain threshold over a designated period of time. Such response may be detected at the surface.

Following either transmitting a command to the tool at step 250 or waiting for a tool response at 260, the tag carrier continues downhole at step 270. For example, once a pressure signal is received at the surface indicative that the tool received the command signal and acted appropriately, pumping pressure is increased to dislodge the tag carrier from the position from step 240 (e.g., pass the tag carrier through the seat).

In one or more of the embodiments described herein, the stop comprises a seat.

In one or more of the embodiments described herein, the tag carrier comprises a dart, the stop comprises a seat, the seat comprises a flexible material, the stop is operated by increased fluid pressure driving the dart through the seat, and a body of the dart comprises a stiff material.

In one or more of the embodiments described herein, the dart body comprises a mandrel and a ball stud for being caught in the seat, the dart further comprises one or more fins stacked along the mandrel, the ball stud is connected to a trailing end of the mandrel, and the radio frequency identification tag is disposed in a nose of the mandrel.

In one or more of the embodiments described herein, the flexible material is an elastomer or elastomeric copolymer, and the stiff material is an engineering polymer or fiber reinforced composite.

In one or more of the embodiments described herein, the control sub further comprises a tubular housing having couplings at each longitudinal end thereof, and one of the couplings is for mating with a coupling of the downhole tool.

In one or more of the embodiments described herein, the control sub further comprises: an electronics package in electrical communication with the antenna; a battery in electrical communication with the electronics package; an actuator in electrical communication with the electronics package, a reservoir of hydraulic fluid; and a piston for connection to the downhole tool; the actuator is linkable with the downhole tool for operation thereof and the actuator comprises: an electric motor for driving a pump; and the pump for supplying the hydraulic fluid from the reservoir to the piston.

In one or more of the embodiments described herein, the actuator further comprises: a spool valve movable between a first position and a second position; and an electric motor in electrical communication with the electronics package for moving the spool valve between the positions, the spool valve provides fluid communication between the pump and a first face of the piston while providing fluid communication between the hydraulic reservoir and a second face of the piston in the first position, and the spool valve provides fluid communication between the pump and the second face of the piston while providing fluid communication between the hydraulic reservoir and the first face of the piston in the second position.

In one or more of the embodiments described herein, the control sub further comprises: an electronics package in electrical communication with the antenna; a battery in electrical communication with the electronics package; an actuator in electrical communication with the electronics package; a reservoir of hydraulic fluid; a piston for engagement with a piston of the downhole tool; and a return spring for biasing the actuator piston into engagement with the piston of the downhole tool, the actuator is linkable with the downhole tool for operation thereof; and the actuator further comprises a control valve for selectively providing or blocking fluid communication between the piston and the reservoir.

In one or more of the embodiments described herein, the downhole tool is a circulation sub and comprises: a bore extending therethrough a tubular housing; one or more circulation ports formed through a wall of the housing; and a valve sleeve for selectively opening and closing the ports.

In one or more of the embodiments described herein, the downhole tool further comprises a bore valve for selectively opening and closing the bore of the downhole tool, and a valve member of the bore valve is connected to the valve sleeve below the circulation ports such that the bore valve is closed when the circulation ports are open and the bore valve is open when the circulation ports are closed.

In one or more of the embodiments described herein, the control sub further comprises an electronics package in electrical communication with the antenna; a battery in electrical communication with the electronics package; an actuator in electrical communication with the electronics package; and an arrival sensor in electrical communication with the electronics package; the actuator is linkable with the downhole tool for operation thereof; and the arrival sensor links the stop to the housing for closing a circuit in response to catching of the tag carrier.

In one or more of the embodiments described herein, the control sub further comprises: an electronics package in electrical communication with the antenna; a battery in electrical communication with the electronics package; an actuator in electrical communication with the electronics package; and an arrival sensor in electrical communication with the electronics package; the actuator is linkable with the downhole tool for operation thereof; the arrival sensor comprises: a first part of an electrical circuit disposed in the stop; and a second part of an electrical circuit carried by the tag carrier, and the electrical circuit is closed by catching of the tag carrier.

In one or more of the embodiments described herein, the system further includes a launcher for connecting to a top of a drill pipe string and releasing the tag carrier into the drill pipe string; and a swivel for connecting the launcher to a quill of a top drive.

In one or more of the embodiments described herein, the stop comprises a seat and a seat sleeve having a thick walled portion and a thin walled portion, the thick walled portion has an inner diameter fit to an outer diameter of the seat, the thin walled portion has an inner diameter greater than the outer diameter of the seat to form a seat chamber therebetween, and the seat sleeve is movable between a catch position and a release position.

In one or more of the embodiments described herein, the stop further comprises a piston for moving the seat sleeve between the positions, the control sub further comprises: an electronics package in electrical communication with the antenna; a battery in electrical communication with the electronics package; an actuator in electrical communication with the electronics package, and a reservoir of hydraulic fluid, and the actuator comprises: an electric motor for driving a pump; and the pump for supplying the hydraulic fluid from the reservoir to the piston.

In one or more of the embodiments described herein, the radio frequency identification tag is centrally located within the tag carrier.

In one or more of the embodiments described herein, the tubular string is a drill string, the downhole tool is a circulation sub comprising a port valve, the method further comprises drilling a wellbore using the drill string, the port valve is closed during drilling, the control sub opens the port valve in response to receiving the command signal, and the method further comprises cleaning out the wellbore using the open port valve.

In one or more of the embodiments described herein, the tubular string is a work string, the work string further comprises a drill pipe string, the method further comprises: running a second tubular string into a wellbore using the work string; and pumping cement slurry into the drill pipe string adjacent to the tag carrier, and the cement slurry is pumped through the drill pipe string with the tag carrier.

In one or more of the embodiments described herein, the cement slurry is pumped behind the tag carrier, the downhole tool is a circulation sub comprising a port valve and a bore valve, the port valve is open and the bore valve is closed during pumping, thereby diverting fluid displaced by the tag carrier up an inner annulus formed between the tubular string and the work string, and the control sub closes the port valve and opens the bore valve in response to receiving the command signal.

In one or more of the embodiments described herein, closing of the port valve and opening of the bore valve forces the cement slurry to flow up an outer annulus formed between the tubular string and the wellbore.

In one or more of the embodiments described herein, the second tubular string comprises a float collar, the work string extends into the float collar and props open the float collar, and the method further comprises removing the work string from the float collar, thereby allowing the float collar to close.

In one or more of the embodiments described herein, the wellbore is a subsea wellbore, and the second tubular string is a surface casing string.

In one or more of the embodiments described herein, the stop comprises a seat, a seat sleeve is engaged with the seat while the tag carrier is caught in the seat, and an actuator of the control sub disengages the seat sleeve from the seat in response to the command signal.

In one embodiment, a system for operating a downhole tool includes a pump down plug comprising a flexible material; a radio frequency identification tag coupled with the pump down plug; and a control sub having a bore extending therethrough and comprising: an antenna located adjacent to the bore; and a stop for engagement with the pump down plug, wherein: the radio frequency identification tag is coupled with the pump down plug in relation to the stop and the antenna such that the radio frequency identification tag is aligned with the antenna when the pump down plug is engaged with the stop.

In one or more of the embodiments described herein, engagement of the stop with the pump down plug at least sufficiently slows the pump down plug to ensure communication between the radio frequency identification tag and the antenna.

In one or more of the embodiments described herein, the pump down plug is a dart.

In one or more of the embodiments described herein, the dart comprises a finned portion, a mandrel portion, and a tail portion, and the radio frequency identification tag is disposed in the tail portion.

In one or more of the embodiments described herein, the flexible material is a foamed elastomer, the stop comprises a stiff material, and the stiff material is an engineering polymer or fiber reinforced composite.

In one or more of the embodiments described herein, the system further includes a launcher for assembly as part of a supply line connecting a mud pump to a top drive and for releasing the pump down plug into the supply line.

In one or more of the embodiments described herein, the pump down plug is a pig.

In one embodiment, a system for operating a downhole tool includes a tag carrier; a control sub having a bore extending therethrough and comprising: an electronics package; a pressure sensor in fluid communication with the bore and in electrical communication with the electronics package for detecting a pressure pulse in the bore; and a stop comprising: a seat for catching the tag carrier; and a seat sleeve having a thick walled portion and a thin walled portion, wherein: the thick walled portion has an inner diameter fit to an outer diameter of the seat, the thin walled portion has an inner diameter greater than the outer diameter of the seat to form a seat chamber therebetween, and the seat sleeve is movable between a catch position and a release position.

In one or more of the embodiments described herein, the seat comprises a flexible material.

In one or more of the embodiments described herein, the seat is a collet having a base portion, fingers extending from the base portion, and lugs formed at ends of the fingers.

In one or more of the embodiments described herein, the stop further comprises a piston for moving the seat sleeve between the positions, the control sub further comprises: a battery in electrical communication with the electronics package; an actuator in electrical communication with the electronics package, and a reservoir of hydraulic fluid, and the actuator comprises: an electric motor for driving a pump; and the pump for supplying the hydraulic fluid from the reservoir to the piston.

In one or more of the embodiments described herein, the system further includes a latch connected to the control sub; a liner hanger fastened to the latch; and a setting tool connected to the latch and operable to set the liner hanger in response to fluid pressure exerted on the caught tag carrier.

In one or more of the embodiments described herein, the system further includes an accumulator connected to the control sub; a latch connected to the accumulator; an expandable liner hanger fastened to the latch; and an expander connected to the latch, wherein fluid pressure exerted on the caught tag carrier and the accumulator facilitate operation of the expander.

While the foregoing is directed to embodiments of the present disclosure, other and further embodiments of the disclosure may be devised without departing from the basic scope thereof, and the scope of the invention is determined by the claims that follow.

The invention claimed is:

1. A command signal transmission system, comprising:
   a tag carrier for use in a tubular string and comprising:
   a centering portion having an outer diameter corresponding to an inner diameter of the tubular string; and
   a RFID tag having a longitudinal axis, wherein, when the tag carrier is used in the tubular string, the longitudinal axis of the RFID tag is oriented parallel to a longitudinal axis of the tubular string; and
   a control sub having a bore extending therethrough, the control sub comprising:
   an antenna located adjacent to the bore; and
   a stop for catching the tag carrier, wherein:
   when the tag carrier is caught in the stop, the longitudinal axis of the RFID tag is aligned with the antenna, and
   the stop is operable to allow passage of the tag carrier through the stop after the tag carrier is caught by the stop.

2. The system of claim 1, wherein the centering portion comprises at least one of a fin, a finned portion, a finned seal, a pig body, and a flexible material.

3. The system of claim 1, wherein the outer diameter of the centering portion comprises at least one of a non-compressed diameter of a finned portion and a maximum outer diameter of a pig body.

4. The system of claim 1, wherein the outer diameter of the centering portion is greater than or equal to the inner diameter of the tubular string.

5. The system of claim 1, wherein, when the tag carrier is used in the tubular string, the centering portion sealingly engages the tubular string.

6. The system of claim 1, wherein, when the tag carrier is used in the tubular string, the longitudinal axis of the RFID tag varies by +/−45 degrees from parallel with the longitudinal axis of the tubular string.

7. The system of claim 1, wherein the tag carrier comprises a pig, and a shape of the pig comprises at least one of an elongated shape, an American football, an ellipsoid, a prolate, an egg, a capsule, and a bullet.

8. The system of claim 1, further comprising a tag carrier launcher and a tag reader/programmer.

9. The system of claim 8, wherein the tag reader/programmer is downhole from the tag carrier launcher.

10. The system of claim 1, wherein the RFID tag is centrally located within the tag carrier.

11. The system of claim 1, wherein, when the tag carrier is caught in the stop, the tag carrier has come to a complete halt.

12. A method of transmitting a command signal, comprising:
    launching a tag carrier carrying a RFID tag into a tubular string, wherein the tubular string comprises a control sub;
    pumping the tag carrier down the tubular string;
    positioning the RFID tag in a vicinity of an antenna of the control sub and aligning a longitudinal axis of the RFID tag with the antenna of the control sub, wherein the positioning comprises at least one of:
    centralizing the RFID tag within the tubular string;
    moving the RFID tag radially within the tubular string; and
    catching the tag carrier with a stop; and
    transmitting the command signal from the RFID tag to the antenna while the RFID tag is positioned in the vicinity of the antenna.

13. The method of claim 12, further comprising programming the RFID tag.

14. The method of claim 13, further comprising loading the tag carrier into a tag carrier launcher prior to the launching the tag carrier, wherein the programming the RFID tag occurs after the loading the tag carrier and before the launching the tag carrier.

15. The method of claim 13, further comprising, after launching the tag carrier, confirming the programming of the RFID tag.

16. The method of claim 15, further comprising, after confirming the programming of the RFID tag, repeating the launching and programming steps with a second tag carrier.

17. A method of transmitting a command signal, comprising:
 loading a tag carrier carrying a RFID tag into a tag carrier launcher;
 launching the tag carrier into a tubular string, wherein the tubular string comprises an antenna;
 programming the RFID tag after loading the tag carrier and before launching the tag carrier;
 pumping the tag carrier down the tubular string; and
 positioning the RFID tag in a vicinity of the antenna and aligning a longitudinal axis of the RFID tag with the antenna.

18. The method of claim 17, further comprising, after launching the tag carrier, confirming the programming of the RFID tag.

19. The method of claim 18, further comprising, after confirming the programming of the RFID tag, repeating the launching and programming steps with a second tag carrier.

20. The method of claim 17, further comprising transmitting the command signal from the RFID tag to the antenna while the RFID tag is positioned in the vicinity of the antenna.

21. The method of claim 12, wherein the longitudinal axis of the RFID tag varies by +/−45 degrees from parallel with a longitudinal axis of the tubular string.

22. The method of claim 17, wherein the longitudinal axis of the RFID tag varies by +/−45 degrees from parallel with a longitudinal axis of the tubular string.

\* \* \* \* \*